US007103570B1

(12) United States Patent
Morea et al.

(10) Patent No.: US 7,103,570 B1
(45) Date of Patent: Sep. 5, 2006

(54) MERCHANT ACCOUNT ACTIVATION SYSTEM

(75) Inventors: Dominic John Morea, Massapequa Park, NY (US); George S. Zirkel, North Babylon, NY (US); John Duncan, Eatons Neck, NY (US); Steven Citarella, Massapequa Park, NY (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 09/473,383

(22) Filed: Dec. 28, 1999

(51) Int. Cl.
*G06F 17/60* (2006.01)
(52) U.S. Cl. .......................................... 705/38; 705/27
(58) Field of Classification Search ................ 705/26, 705/27, 35, 38; 713/1
See application file for complete search history.

(56) References Cited

U.S. PATENT DOCUMENTS

| | | | | |
|---|---|---|---|---|
| 5,231,569 A | * | 7/1993 | Myatt et al. | 705/38 |
| 5,263,164 A | * | 11/1993 | Kannady et al. | 713/1 |
| 5,321,243 A | * | 6/1994 | Groves et al. | 235/449 |
| 5,479,530 A | * | 12/1995 | Nair et al. | 382/119 |
| 5,484,988 A | * | 1/1996 | Hills et al. | 235/379 |
| 5,894,571 A | * | 4/1999 | O'Connor | 713/2 |
| 5,897,622 A | * | 4/1999 | Blinn et al. | 705/26 |
| 6,135,349 A | * | 10/2000 | Zirkel | 704/38 X |
| 6,167,383 A | * | 12/2000 | Henson | 705/26 |
| 6,182,212 B1 | * | 1/2001 | Atkins et al. | 713/1 |
| 6,209,089 B1 | * | 3/2001 | Selitrennikoff et al. | 713/2 |
| 6,256,635 B1 | * | 7/2001 | Arrouye et al. | 707/102 |
| 6,425,133 B1 | * | 7/2002 | Leary | 725/132 |
| 6,714,937 B1 | * | 3/2004 | Eynon et al. | 713/1 X |

FOREIGN PATENT DOCUMENTS

JP 11-272762 * 10/1999 ............. 705/38

OTHER PUBLICATIONS

Murphy, Patricia. 'Ring up profits for your clients and firm!' Accounting Technology, Nov. 1993, v9n9, pp33-42. (Full text) ABI/Inform [online]. Retrieved from: Dialog [retrieved on Jun. 15, 2003].*

(Continued)

*Primary Examiner*—Gerald J. O'Connor
(74) *Attorney, Agent, or Firm*—Morris, Manning & Martin LLP

(57) ABSTRACT

A merchant account activation system that includes an Internet server that works in conjunction with a master account file operating on a mainframe computer and an expert computer system that is used to configure point-of-sale terminals. Many of the steps of the activation procedure are performed by a merchant activation routine running on the Internet server, which allows a merchant to apply for a merchant account during an on-line session conducted with the Internet server. The merchant activation routine obtains application information from the applicant during an on-line session, conducts a credit check and "scores" the application as a credit risk during the on-line session. If the application is approved, the merchant activation routine displays a fee schedule and associated terms and conditions to the applicant for acceptance. In response to merchant acceptance of the terms and conditions of a merchant account during an on-line session, the merchant activation routine or an associated computer operated by the acquirer generates identification information associated with the merchant account and the point-of-sale terminal, such as a Merchant Identification Number (MID) and a Termination Identification Number (TID).

23 Claims, 20 Drawing Sheets

OTHER PUBLICATIONS

Broome, J. Tol Jr. 'Reduce cash handling with POS debit cards.' Video Business, Oct. 28, 1994, v14n42, p46. (Full text) Gale Group Trade and Industry Database [online]. Retrieved from: Dialog [retrieved on Jun. 15, 2003].*

"Concord Claims Maryland Market a Monopoly Game," Mar., 1993, *POS News*.*

"Beyond.com Now Selling Atomic Software's Authorizer Payment Software," Mar. 16, 1999, *Business Wire*.*

* cited by examiner

Congratulations !

If you have recently opened your business or have decided it's time to review your credit card processing arrangements, you've come to the right place. With Express Merchant Processing Solutions™, you can complete this on-line application in 15 minutes! If you need equipment, leasing options are available for point o sale terminals as well. If you already own a terminal, we'll set-up your current equipment* at n additional cost.

It's simple and it's secure: all of your application information is encrypted. You can be approved and ready to process credit cards in as little as two to tree business days!

If your business can be categorized as one of the following business types**, then click here to learn more!

- Furniture Stores and/or
- Floor Covering
- Mail order/Telephone Order oriented business
- Internet and/or e-commerce business
- Electronics and/or Computer
- Stores
- Travel Agencies and/or Reservation Services
- Membership and/or Subscription businesses Before you begin, please make sure you have the following information nearby to complete the application:

- Business contact information
- Federal tax ID number (or Social Security # if not incorporated)
- Current credit card processor contact info (if applicable)
- Business owner and bank reference information
- Funding information (bank routing numbers for your business's checking account)

[ Continue ]   [ Cancel ]

* If your terminal equipment is not listed in the "Order Equipment" section, you will have to either choose to lease from the listed options or call 877-590-899 for further information
** If your business can be categorized as one of the listed types, submitting this application will terminate any resulting merchant agreement and may result in a change to shown "Service Fees."

FIG. 8

Conditions...

In order to proceed with his online application, you must meet these requirements and conditions:

YOU MUST:

- Be at least 18 years of age
- Have a checking account used primarily for business for your credit card
- sales credits
- Be an officer of the business establishment and/or authorized to act on behalf of the company
- Be of one of the following business type... If you're not, then click here.

- Restaurant or Food Store  *920*
  - Retailer of Clothing - Men's, Women's, Children's, etc....
  - Retailer of low-end Jewelry – Watches, trinkets, etc....
  - Professional Services – Doctor, Physician, Veterinarian, or Legal Services
  - Miscellaneous Retail or Repair
  - Berber or Beauty shop Merchants with large Visa/MasterCard volumes, click here!  *908*

Review what you will need to complete the application in more detail.
*910*

[ Continue ] *902*    [ Cancel ] *904*

| Step 1 of 6: Enter General Information |
|---|
| Please note that fields marked with an asterisk(*) are required. |

Business Contact:

* Business Name: DBA Name: ⎯1002    Legal Business Name: ⎯1004
* Address: Street Address: (No PO Boxes Plase) ⎯1006
  City: ⎯1008    State: 1010    Zip: 1012
* Authorized Signer: Signer (Name of Contracting Person): ⎯1014    Title: 1016 [Treasurer]
* Telephone: (9999999999) ⎯1018
  Fax Number: (9999999999) ⎯1020
* Attention to: ⎯1022
  Email Address: ⎯1024
  WEB Store Address: ⎯1026
* Type of Business: [Auto Parts Store] ⎯1028
* Business Category: [Retail] ⎯1030

FIG. 10

Business Premises :

* Zone: [Business District ▼] ~1102

* Location: [Mail ▼] ~1104

* Type of Ownership: [Sole Proprietorship ▼] ~1106

*State Incorporated: [____] 1108

*Federal tax ID (or Social Security if not incorporated): [_____] (9999999999) 1110

*Date Business Began: [_____] (MM/YYYY) 1112

Number of Employees: [____] 1114

*What does Your business sell? [_____] 1116

FIG. 11

Sales Data:

| | |
|---|---|
| * Total cash and Credit sales: | $ [Business District] ,000.00 — 1202 |
| * Sales tax: | [Mail] % — 1204 |
| Refund policies For MC/Visa: (if applicable) | ☐ Exchange<br>☐ Store Credit<br>☑ Refund with [0-3 Days ▼] to submission — 1208<br>— 1206 |
| *MC/Visa sales are submitted at: | [Date of Order ▼] — 1210 |
| *Annual MC/Visa Sales: | $ [ ] ,000 — 1212 |
| *Average Sale Amount: | $ [ ] — 1214 |

FIG. 12

Facility Information:

| | |
|---|---|
| Advertising Name Display: | ☐ Window ☐ Door ☐ Store Front — 1302 |
| * Store Located On? | One must be chosen:<br>◉ Ground Floor ○ Other — 1304 |
| *Facility Square Footage? | [0-3 Days ▼] — 1306 |

| Business Procedures : | | | |
|---|---|---|---|
| * What % of your sales are from: | In Store<br>Mail order/Telephone order<br>Internet<br>TOTAL | [100]% ~1402<br>[0]% ~1404<br>[0]% ~1406<br>100% | |
| *Products are delivered in: | 0-7 days<br>8-14 days<br>15-30 days<br>30+ days<br>TOTAL | [100]% ~1408<br>[0]% ~1410<br>[0]% ~1412<br>[0]% ~1414<br>100% | |
| How do you Advertise? 1416 | ☑ Broshure/Mail<br>☐ Catalog<br>☐ TV/Radio<br>☐ Newspaper/Magazine | | |
| Do you currently accept credit cards? | If so, please provide the information below on your current processor:<br>Current Processor Name: ⁄1418<br>[                    ]<br>Phone Number: ⁄1420<br>[                    ] (9999999999) | | |

Please use these Navigation Buttons to complete the application steps...

| 1 General Info | 2 Business Reference | 3 Funding Info | 4 Chose Processing Type | 5 Order Equipment | 6 Service Fees | Submit | Cancel |

Step 2 of 6: Enter Owner and Reference Information

Please provide the following information regarding the Owner(s), Partner(s), or Officer(s) of your business. This information is mandatory, even if it is the same as previously provided information. Field marked with an asterisk (*) are required. If you are not sure of the exact numbers requested in the Bank Reference section, please estimate.

First Owner / Partner / Officer :

* Name: First Name: 1502    Middle: 1504    Last Name: 1506
* Address: Street Address: 1508
  City: 1510    State: 1512    Zip: 1514
* Title [Owner] 1516
*Telephone: (9999999999) 1518
*Social Security Number: (9999999999) 1520

Second Owner / Partner / Officer :

* Name: First Name: 1522    Middle: 1524    Last Name: 1526
* Address: Street Address: 1528
  City: 1530    State: 1532    Zip: 1534
* Title [Partner] 1536
*Telephone: (9999999999) 1538
*Social Security Number: (9999999999) 1540

| Bank Reference Information – Please estimate if necessary |
|---|

*Bank Name: [_____]
                                        ↳1602

* Address: Street Address:                1604
[_____]

City:   1606    State: 1608  Zip: 1610
[_____]        [____]       [____]

1612
*Telephone: [_____]  (9999999999)

1614
*Contact Name: [_____]

1616
*Date Relationship Opened: [_____] (MM/YYYY)

1618
*Are you a Borrower: ⦿Yes  ○No

1620
*Average Balance: $ [Business District],000.00

1622
*Total Loans/Credit Facilities: $ [Business District],000.00

1624
*Total Other Business /  $ [Business District],000.00
Personal Account Balances:

FIG. 16

Step 3 of 6: Enter Founding Information

The Demand Deposit Account (DDA) and American Banker's Association (ABA) numbers are extremely important for the funding of your credit card transactions. This information directs the funds to your bank an business checking account. Express Merchant Processing Solutions™ will credit your business checking account for submitted sales transactions and/or debit the account for chargebacks and other fees (when applicable). Both fields below are required.

Please refer to checks for your business checking account. The DDA and ABA numbers are located on the lower left corner of the checks.

* ABA Number: [_____] (for example: 044000037)
* DDA Number: [_____] (for example: 0000000000)

Here is an example:
I:044000371: 0000000001  0151
ABA Number   DDA Number

Please double check your entries before you proceed. The accuracy of these numbers is extremely important to ensure that you receive your funding correctly.

Step 4 of 6: Choose Processing Types

Choose the card types you would like to accept at your business. MasterCard® and Visa® assumed and automatically setup.

1802 ☑ MasterCard®

1804 ☑ Visa®

1806 ☐ American Express®
    1816 ◯ I do not have an American Express number and need to apply for one.
    1818 ◯ I do have an existing American Express Number and it is _____ 1820

1808 ☐ Discover®
    I have an existing Account Number and it is _____ 1822

1810 ☐ Diner's Cub®

1812 ☐ JCB®

1814 ☐ Debit® - you must have a debit capable terminal and pinpad!

Please use these Navigation Buttons to complete the application steps...

| 1 General Info | 2 Business Reference | 3 Funding Info | 4 Chose Processing Type | 5 Order Equipment | 6 Service Fees | Submit | Cancel |

— 1824

All Copyrights, trademarks and service marks referenced n this website are the property of their respective owners.

FIG. 18

Step 5 of 6: Equipment Selection and Fees

All of the following equipment options are recommended for retail and restaurant establishments. If you have elected to accept debit transactions, please ensure that you select an equipment package that is inclusive of a pinpad. Also, don't forget to purchase an imprinter! If you have any question, please contact a representative to inquire about our terminal options ◉ Lease    ○ Customer Owned

| Select | Package Description | Images | Lease Price | Lease (36 Months) | Customer Owned | Debit |
|---|---|---|---|---|---|---|
| ○ | T7P | VIEW | $35.99 | ✓ | ✓ | NO |
| ○ | T7P/S7CR | VIEW | $51.99 | ✓ | ✓ | ✓ |
| ○ | Omni 396/P350 | VIEW | $35.99 | ✓ | ✓ | NO |
| ○ | Omni 396/P350/P1000 | VIEW | $47.99 | ✓ | ✓ | ✓ |
| ○ | T77 | VIEW | $35.99 | ✓ | ✓ | NO |
| ○ | T77/S7CR | VIEW | $51.99 | ✓ | ✓ | ✓ |
| ○ | Tranz330/P250 | VIEW | N/A | NO | ✓ | NO |
| ○ | Tranz330/P250/P1000 | VIEW | N/A | NO | ✓ | ✓ |

| Select | Additional Equipment | Images | Cost |
|---|---|---|---|
| ☑ | Imprinter | VIEW | $35.00 |

Please use these Navigation Buttons to complete the application steps...

1 General Info | 2 Business Reference | 3 Funding Info | 4 Chose Processing Type | 5 Order Equipment | 6 Service Fees | Submit | Cancel All Copyrights, trademarks and service marks referenced n this website are the property of their respective owners.

FIG. 19

Step 6 of 6: Service Fees

| CARD TYPE | RATE |
|---|---|
| MasterCard | **** |
| Visa | **** |
| Diner's Club (Lic) | 2.80 |

| TRANSACTION DESCRIPTION | AMOUNT |
|---|---|
| MC SALE TRANSACTION | 0.26 |
| VISA SALE TRANSACTION | 0.26 |
| MC VOICE AUTH | 0.65 |
| VISA VOICE AUTH | 0.65 |
| DINERS LOCAL AUTH | 0.15 |
| DINERS WATS AUTH | 0.15 |
| DINERS EDC CAPT | 0.00 |
| DEB/ATM TRAN FEE | 0.20 |
| MC FOREIGN HANDLING | 0.01 |
| VISA FOREIGN HANDLING | 0.01 |
| MIN PROCESSING FEE | 25.00 |
| CHARGEBACK FEE | 15.00 |
| MONTHLY SERVICE FEE | 10.00 |
| ACH REJECT FEE | 10.00 |
| SET UP FEE | 39.95 |
| DEBIT INTERCHANGE | 0.00 |

Please use these Navigation Buttons to complete the application steps...

1 General Info | 2 Business Reference | 3 Funding Info | 4 Chose Processing Type | 5 Order Equipment | 6 Service Fees | Submit | Cancel All Copyrights, trademarks and service marks referenced n this website are the property of their respective owners.

FIG. 20

Summary of Terms and Agreement

From time to time you may have questions regarding the contents of your processing agreement with us. The following information summarize portions of the Agreement in order to assist you in answering some of the questions we are most commonly asked:

Certain terms of the Agreement such as pricing, are dependent upon the information you have provided and certain assumptions regarding your business and bankcard processing. Accuracy of the MasterCard/Visa volume and average sale amount indicated on the application is also an important component of servicing your account. The price charged may be changed retroactively in the event the information or assumptions are incorrect or there is a change in your business. If you are billed back for such an increase in price you may be charged an additional amount with regard to each transaction processed at the incorrect price.

We may debit your bank account from time to time for amount owned to us under the Agreement.

Funding for your Card transactions which are settled by us, will be initiated one business day after your submission of the transactions for processing.

The account you designate as your settlement account must be a demand deposit account that is primary used for business purpose.

There are many reasons why a Chargeback may occur. When they occur we will debit your settlement funds of settlement account. For a more detailed discussion regarding Chargeback see Section 6 of the Agreement.

If you dispute any charge or funding, you must notify us within 45 days of the date of the statement where the charge or funding appears.

The Agreement limits our liability to you. For a detailed description of the limitation of liability see Section 7 of the Agreement.

We have assumed certain risk by agreeing to provide you with bankcard processing. Accordingly, we may take certain actions to mitigate our risk, including termination of the Agreement or establishment of a reserve account under certain circumstances. In addition, actual sales deposits materially greater than estimates provided by you result in funding delays and/or additional information requirements to support a reevaluation of your account.

By executing the Agreement with us, you are authorizing us to obtain financial and credit information regarding you and your business throughout the term of the Agreement.

The Agreement contains a provision that in the event you terminate the Agreement early, you will be responsible for he payment of and early termination fee.

We hope that the above information is helpful to you. Of course, in the even any of the above information conflicts with the Agreement, the terms of the Agreement will control.

View the Merchant Services Bankcard Agreement.

Personal Guaranty
In exchange for The Northern Trust Company and First Data Merchant Services' acceptance of this Agreement, the individual entering this Agreement on behalf of CUSTOMER unconditionally guarantees performances of CUSTOMER's obligations under this Agreement and payment of all sums due hereunder. This is a Guaranty of payment and not of collection and The North Trust Company and First Data Merchant Services are relying upon this Guaranty in entering this

FIG. 21

MERCHANT ACCOUNT ACTIVATION SYSTEM

TECHNICAL FIELD

This invention relates to electronic commerce and, more particularly, relates to a system for electronically activating merchant accounts and ordering point-of-service merchant account equipment, typically over the Internet.

BACKGROUND OF THE INVENTION

Merchant accounts allow businesses to accept payment by credit cards and other payment instruments that rely on remote validation and/or transaction processing. For convenience, merchant accounts will be described in the context of credit cards. Nevertheless, it should be understood that merchant accounts may also be used in connection with other payment instruments that rely on remote payment-source validation and/or transaction processing, such as debit cards, smart cards, wire transfers, money orders, traveler's checks, personal checks, and various types of e-money. In fact, the merchant accounts described in this specification may be used in connection with any type of financial transaction system that uses some type of remote payment-source validation and/or remote transaction processing.

Basically, a "merchant account" is a contractual arrangement between a merchant and an "acquirer," such as First Data Merchant Services, that remotely processes financial transactions conducted by the merchant. For example, the merchant accepts credit-card transactions as payment for goods or services provided to its customers, and the acquirer performs the services of remote credit card validation and transaction processing. Typically, the merchant enters information from the magnetic strip on the credit card into a point-of-sale terminal using a "card swipe" reader or a keypad on the terminal. In response, the terminal automatically places a telephone call to the acquirer's computer system, which performs the validation and transaction processing operations. Specifically, if the credit card is validated, the acquirer charges the cost of the transaction to the customer's credit card account, and credits the corresponding value to the merchant's account. To provide these services, the acquirer maintains contractual relationships and electronic communication capabilities with all or many of the major credit card issuers. This allows the acquirer to validate the credit cards and process the transactions in "real time" at the time of the transaction. For this service, the acquirer charges a small fee per transaction.

To establish this type of merchant account, the merchant typically applies for the account by filling out a written application. The merchant account application includes information relating to the type of business, its location, sales data, owners, bank accounts, authorization to pay for the merchant account services, and so forth. After receiving the written application, the acquirer manually transcribes the information from the application into the acquirer's computer system. The acquirer then conducts a credit check and, based on the merchant's credit rating and type of business, determines a fee schedule and associated terms and conditions for providing the merchant account services. The acquirer then incorporates this information into a written contract, which is delivered to the merchant.

If the merchant agrees to the fee schedule and associated terms and conditions, the merchant signs the contract and returns it to the acquirer. At this point, the merchant may also order one or more point-of-sale terminals from the acquirer for use in accepting credit card payments. To enable the acquirer's computer system to communicate with each point-of-sale terminal, the merchant obtains telephone service for each point-of-sale terminal and specifies the associated telephone directory number for each point-of-sale terminal. Upon receipt of the executed contract and the point-of-sale equipment order, the acquirer assigns the merchant a "Merchant Identification Number" (MID). The acquirer also assigns each point-of-sale terminal a "Terminal Identification Number" (TID), loads operating software onto the point-of-sale terminals, and configures each terminal with the associated MID/TID and the appropriate telephone number for accessing the acquirer's computer system.

The acquirer also provisions its master account file with a record for the new merchant account, including the MID/TID information, the telephone directory number assigned to each point-of-sale terminal (or alternatively using network codes), and other information related to the operation of the account, such as accounting and billing schedules. The acquirer is now ready to receive and process credit card transactions for the merchant account via telephone calls placed from the merchant's point-of-sale terminals to the telephone number assigned to the acquirer's computer system. In addition, the acquirer has the ability to place telephone calls to remotely access the point-of-sale terminals. This allows the acquirer to reconfigure each point-of-sale terminal, for example by downloading new operating software, changing the MID/TID data, altering the telephone number for accessing the acquirer's computer system, and so forth. This may include alteration of file layouts for sending or receiving data transmissions.

The acquirer then ships the point-of-sale terminals to the merchant, who connects each terminal to its associated telephone line or wireless unit. The merchant is now ready to begin accepting credit card transactions. It should be noted that as an alternative to obtaining new point-of-sale equipment as described above, the merchant may use existing point-of-sale equipment. For example, the merchant may already own one or more point-of-sale terminals for use in a new merchant account relationship. In this case, the acquirer may remotely reprogram each point-of-sale terminal by placing a telephone call to the terminal and downloading new operating software and/or configuration data. Alternatively, the merchant may ship the terminals to the acquirer for reprogramming. That is, there are several methods for authorizing a merchant to use a merchant account and ensuring that the MID/TID and telephone information maintained in the merchant's point-of-sale terminal is consistent with that maintained in the acquirer's master account file. The process of accomplishing this result is known as "activating" the merchant account for credit-card transactions.

Although the activation process described above has worked well, it can take several days or weeks to complete. In particular, the use of the mail to deliver the merchant account application to the merchant, and then to receive the completed application from the merchant, typically takes about a week. The data transcription and approval process often takes another week. The process of configuring and delivering one or more point-of-sale terminals to the merchant may take yet another week. In today's world of e-commerce and fast-paced business decisions, this old-world merchant account activation system may unnecessarily delay the start up of new business ventures. Therefore, there is a need for a faster and more efficient system for activating merchant accounts.

SUMMARY OF THE INVENTION

The present invention meets the needs described above in an electronic merchant account activation system, typically implemented using the Internet. This system allows a merchant to complete the merchant account application and agree to its terms and conditions in a matter of minutes during a single on-line session. The completion of the merchant account application results in a web-based collection of data that automatically populates corresponding data fields in the acquirer's master account file and the related activation systems. Using this information, the merchant account activation system automatically conducts a credit check and evaluates the applicant's credit risk in a process known as on-line "scoring." The application then receives an immediate accept or reject decision during the on-line session. If the application is accepted, the merchant may also order point-of-sale terminals for use in connection with the new merchant account. The acquirer then configures its master account file and the point-of-sale terminals, and ships the point-of-sale terminals for delivery to the merchant. If the merchant selects overnight delivery, the merchant may be able to begin using the new merchant account as soon as the next business day.

Alternatively, the merchant may elect to have its existing point-of-sale terminals reprogrammed for use with the new merchant account. In this case, the acquirer responds to an approved application by placing telephone calls to the merchant's existing point-of-sale terminals and reprogramming those terminals for use with the new merchant account. In either case, the merchant may also order supplies during the on-line session, such as credit-card receipts and rolls of paper for use with the point-of-sale terminals. Optionally, the merchant may purchase other goods and services during the on-line session, such as software for operating an on-line store, information relating to financing alternatives, cash registers, customized stationary, and a wide variety of other supplies and information related to the operation of the merchant's business.

Upon receiving a new merchant account application, the merchant activation system also transmits a visitation request to a visitation department or company. This entity typically makes a physical visit to the merchant's premises to verify that the applicant requesting the merchant account actually exists and appears to be in the identified business. The visitation department or company then returns a verification indicating that the visitation has occurred and whether the applicant appears to be in the identified business. The acquirer typically enters the visitation verification into the merchant's record in the master account file to complete the record.

Generally described, the invention includes a method and system for activating a merchant account for use in connection with a point-of-sale terminal. Many of the steps of the method are typically performed by a merchant activation routine running on an Internet server operated by an acquirer, such as First Data Merchant Services. An applicant for a merchant account may apply for the account during an on-line session conducted with this Internet server. To begin the process, the merchant activation routine receives information from an applicant to complete an application for the merchant account. The applicant typically fills in blanks in a series of on-line screens to complete the application. The merchant activation routine also receives information from the applicant selecting a point-of-sale terminal for use in connection with the merchant account. The merchant activation routine then displays terms and conditions to the applicant relating to the administration of the merchant account, and receives an indication of acceptance of the terms and conditions from the applicant. The terms and conditions typically include a fee schedule for services relating to the administration of the merchant account.

In response to acceptance of the terms and conditions, the merchant activation routine or an associated computer operated by the acquirer generates identification information associated with the merchant account and the point-of-sale terminal, such as a Merchant Identification Number (MID) and a Terminal Identification Number (TID). The merchant activation routine then configures an account file for administration of the merchant account with the identification information. This account file is typically maintained in an associated computer operated by the acquirer. In addition, the merchant activation routine schedules the point-of-sale terminal for configuration with the identification information. A technician or an associated expert computer system typically configures the point-of-sale terminal.

In particular, if the merchant has ordered a point-of-sale terminal from the acquirer during the on-line session, a technician or an expert computer system programs the point-of-sale terminal with the identification information and then ships the point-of-sale terminal to the applicant. Alternatively, if the merchant has specified the use of an existing point-of-sale terminal that is already in the possession of the merchant, the merchant activation routine receives a telephone directory number associated with the point-of-sale terminal from the applicant. A technician or an expert computer system subsequently places a telephone call to the telephone directory number associated with the point-of-sale terminal received from the applicant, and reprograms the point-of-sale terminal with the identification information during the telephone call.

The process of receiving information from the applicant completing the application for the merchant account may include prompting the user to enter business contact information, business premises information, business sales data, business owner information, and information relating to funding for the charges associated with administering the merchant account. In addition, during the on-line session the merchant activation routine may determine a credit risk score for the application and, based on the credit risk score, may establish the terms and conditions for the merchant account. During the on-line session, the merchant activation routine may also electronically issue a visitation order requesting a physical visit to the premises of the applicant to verify that the applicant is conducting a type of business stated in the application.

Additionally, during the on-line session, the merchant activation routine may display a menu of point-of-sale terminal options and a view control item in association with each option. The merchant activation routine may then receive a user command selecting a particular view control item. In response, the merchant activation routine displays an image depicting the point-of-sale terminal associated with the selected view control item.

The merchant activation routine may also receive a business type designation from the applicant. The merchant activation routine then determines a business risk category associated with the business type designation. Based on the business risk category associated with the business type designation, the merchant activation routine implements risk adjustment measures. For example, the merchant activation routine may display a menu of risk adjustment measures and receive a user command from the applicant indicating a preferred risk adjustment selection. The merchant activation routine may then implement the risk adjustment measures based on the preferred risk adjustment selection.

Specifically, the merchant activation routine may determine a reserve requirement for the account, display the reserve requirement to the applicant, and receive a user command from the applicant accepting the reserve requirement. Alternatively or additionally, the merchant activation routine may determine a risk-adjusted fee schedule for the account, display the risk-adjusted fee schedule to the applicant, and receive a user command from the applicant accepting the risk-adjusted fee schedule.

Thus, the invention allows a merchant to activate a merchant account during a single on-line session. After completing the on-line application, the merchant can begin accepting credit-card transactions as soon as the associated point-of-sale terminal is received or reprogrammed, which may be the next business day. That the invention improves over the drawbacks of previous methods for activating merchant accounts and accomplishes the advantages described above will become apparent from the following detailed description of the exemplary embodiments and the appended drawings and claims.

BRIEF DESCRIPTION OF THE DRAWINGS

FIG. 8 is an illustration of a display screen for receiving a business type designation in a merchant account activation routine.

FIG. 9 is an illustration of a display screen stating business type conditions in a merchant account activation routine.

FIG. 10 is an illustration of a display screen for receiving business contact information in a merchant account activation routine.

FIG. 11 is an illustration of a display screen for receiving business premises information in a merchant account activation routine.

FIG. 12 is an illustration of a display screen for receiving business sales data in a merchant account activation routine.

FIG. 13 is an illustration of a display screen for receiving business facility information in a merchant account activation routine.

FIG. 14 is an illustration of a display screen for receiving business procedures information in a merchant account activation routine.

FIG. 15 is an illustration of a display screen for receiving business owner information in a merchant account activation routine.

FIG. 16 is an illustration of a display screen for receiving business bank reference information in a merchant account activation routine.

FIG. 17 is an illustration of a display screen for receiving business funding information in a merchant account activation routine.

FIG. 18 is an illustration of a display screen for receiving transaction processing type information in a merchant account activation routine.

FIG. 19 is an illustration of a display screen for receiving point-of-sale terminal information in a merchant account activation routine.

FIG. 20 is an illustration of a display screen for stating a fee schedule in a merchant account activation routine.

FIG. 21 is an illustration of a display screen for stating terms and conditions in a merchant account activation routine.

DETAILED DESCRIPTION OF EMBODIMENTS OF THE INVENTION

The present invention is typically embodied in an Internet server that works in conjunction with a master account file operating on a mainframe computer and an expert computer system that is used to configure point-of-sale terminals. These facilities are typically operated by a merchant account acquirer, such as First Data Merchant Services. Many of the steps of the activation procedure are performed by a merchant activation routine running on the Internet server, which allows a merchant to apply for a merchant account during an on-line session conducted with the Internet server. Although the merchant account activation system is described in the context of the Internet, it should be understood that the system may operate with other types of distributed computing systems, such as an intranet, a wide-area network, a local-area network, a telephone-based dial-in computer system, and the like.

The merchant activation routine obtains application information from the applicant during an on-line session, conducts a credit check and "scores" the application as a credit risk during the on-line session. If the application is approved, the merchant activation routine displays a fee schedule and associated terms and conditions to the applicant for acceptance. In response to merchant acceptance of the terms and conditions of a merchant account during an on-line session, the merchant activation routine or an associated computer operated by the acquirer generates identification information associated with the merchant account and the point-of-sale terminal, such as a Merchant Identification Number (MID) and a Terminal Identification Number (TID). The merchant activation routine then configures an account file for administration of the merchant account with the identification information. This account file is typically maintained in the associated mainframe computer operated by the acquirer.

The merchant activation routine also allows the merchant to order or specify one or more point-of-sale terminals for use in connection with the merchant account. During the on-line session, the merchant activation routine schedules these terminals for configuration with the identification information. A technician subsequently uses the associated expert computer system to configure the point-of-sale terminal. The terminal may be configured at the acquirer's premises and then shipped to the merchant. Alternatively, if the terminal is already in the possession of the merchant, the terminal may be configured remotely during a telephone call placed to the terminal.

Figure 1:
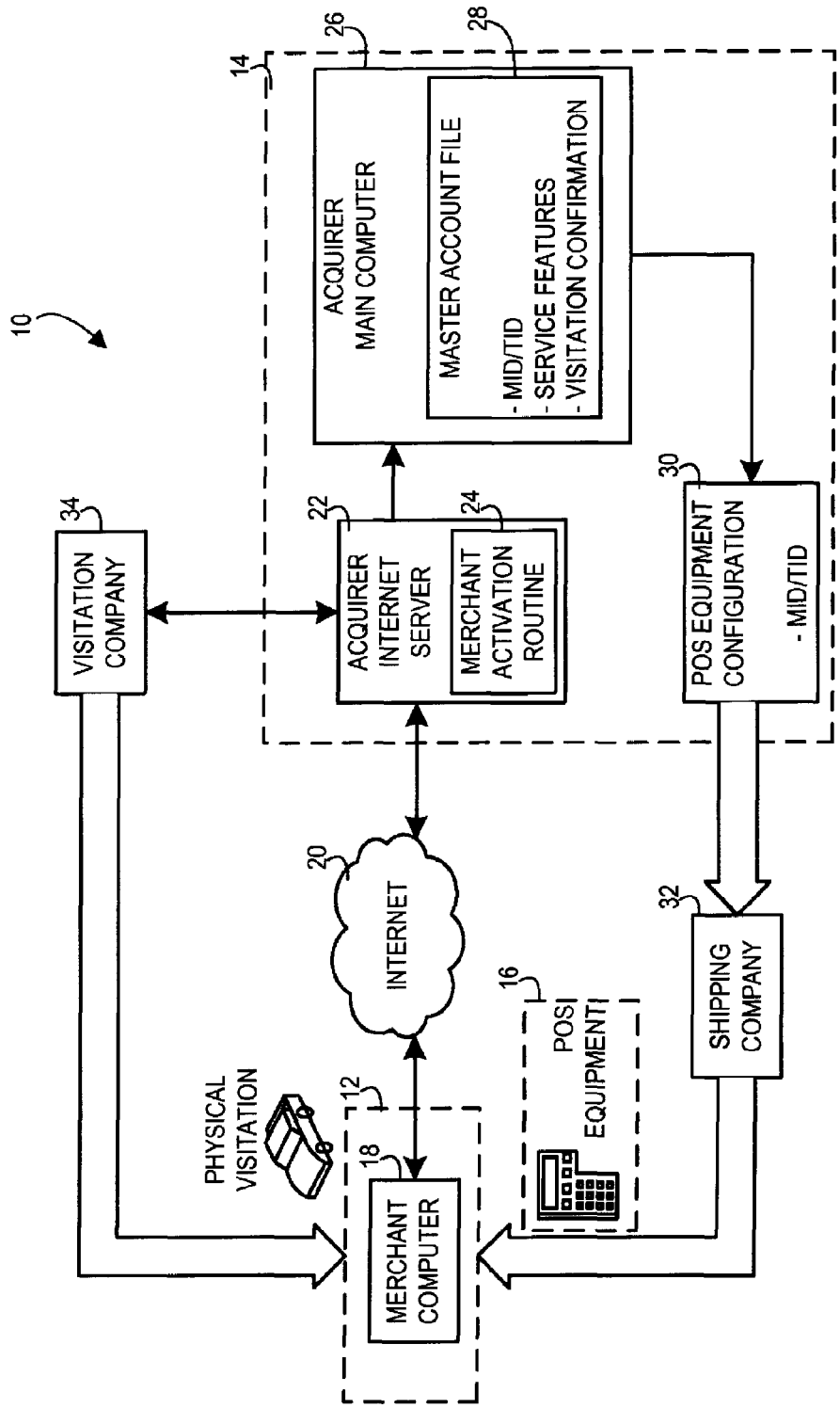
FIG. 1 is a block diagram illustrating a merchant account activation system in which a point-of-sale terminal is shipped to the merchant.

Turning now to the figures, in which like numerals refer to like elements through the several figures, FIG. 1 is a block diagram illustrating a merchant account activation system 10 including a merchant site 12 and an acquirer site 14. In this alternative, a point-of-sale terminal 16 is shipped to the merchant site 12 as the result of an on-line session conducted over the Internet 20 between the merchant computer 18 located at the merchant site 12, and an acquirer Internet server 22 located at the acquirer site 14. In particular, a merchant activation routine 24 running on the acquirer Internet server 22 allows the merchant to activate the merchant account during the on-line session. The acquirer Internet server 22 works in conjunction with a main computer 26 including a master account file 28 that contains a record for each merchant account. The acquirer Internet server 22 also works in conjunction with an expert system 30 that a technician uses to configure point-of-sale terminals, either on-site or remotely over a telephone system.

In addition, the merchant activation routine 24 transmits a visitation request to a visitation department or company 34. This entity typically makes a physical visit to the merchant site 12 to verify that the applicant requesting the merchant account actually exists and appears to be in the identified business. The visitation department or company 34 then returns a verification indicating that the visitation has occurred and whether the applicant appears to be in the identified business. The acquirer typically enters the visitation verification into the merchant's record in the master account file 28 to complete the record for the new merchant account.

A merchant using the merchant computer 18 accesses the acquirer Internet server 22 over the Internet 20 by entering the universal resource locator (URL) associated with the Internet server 22 into a browser operating on the merchant computer 18. This initiates an on-line session between the Internet server 22 and the merchant computer 18 during which the merchant can apply for a merchant account. The process for completing the application is described below with reference to FIGS. 3–21. In sum, the merchant activation routine 24 running on the acquirer Internet server 22 obtains application information from the applicant during an on-line session, conducts a credit check and "scores" the application as a credit risk during the on-line session. If the application is approved, the merchant activation routine 24 displays a fee schedule and associated terms and conditions to the applicant for acceptance. In response to merchant acceptance of the terms and conditions of a merchant account during an on-line session, the merchant activation routine 24 or the associated computer 26 generates identification information associated with the merchant account and the point-of-sale terminal, such as a Merchant Identification Number (MID) and a Terminal Identification Number (TID). The merchant activation routine 24 then directly or indirectly creates a record in the master account file 28 for the new merchant account and configures the record with the MID/TID identification information.

That is, if the application is approved by the acquirer and accepted by the merchant, the merchant activation routine 24 running on the Internet server 22 directly or indirectly generates identification information including the MID associated with the merchant account and a TID associated with each point-of-sale terminal. Specifically, the Internet server 22 itself may generate the MID/TID identification information, or alternatively the Internet server 22 may trigger the main computer 26 to generate the MID/TID identification information. In either case, the identification information is preferably generated and configured into the master account file 28 during the on-line session.

The merchant activation routine 24 also allows the merchant to order or specify one or more point-of-sale terminals 16 for use in connection with the merchant account. During the on-line session, the merchant activation routine 24 schedules these terminals for configuration with the MID/TID identification information. A technician subsequently uses the associated expert computer system 30 to configure the point-of-sale terminal 16. The terminal may be configured at the acquirer's premises and then shipped to the merchant. In the example illustrated in FIG. 1, the technician configured the point-of-sale terminal 16 on-site, and shipping company 32 delivers the configured point-of-sale terminal 16 to the merchant site 12.

Figure 2:
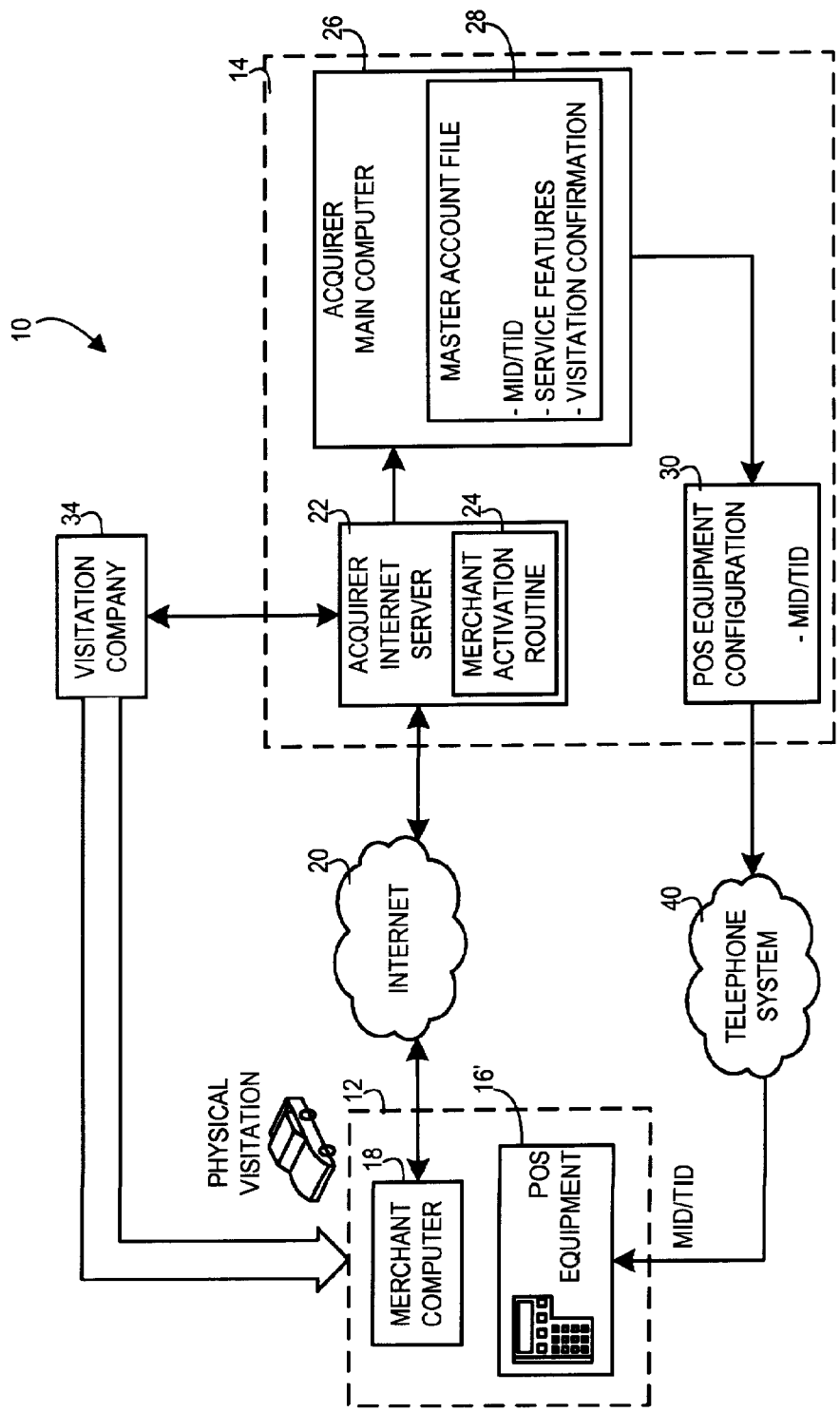
FIG. 2 is a block diagram illustrating a merchant account activation system in which a point-of-sale terminal in the possession of the merchant is reprogrammed.

FIG. 2 is a block diagram illustrating the merchant account activation system 10 in which a point-of-sale terminal 16' in the possession of the merchant is reprogrammed. The merchant account activation system 10 is identical to the system described with reference to FIG. 1, except that terminal 16' is already in the possession of the merchant. In this case, the merchant activation routine 24 receives a telephone directory number associated with the point-of-sale terminal 16' during the on-line session. A technician subsequently uses the expert computer system 30 to place a telephone call to the telephone directory number associated with the point-of-sale terminal 16' over the telephone system 40, and reprograms the terminal with the MID/TID identification information during the telephone call.

Figure 3:
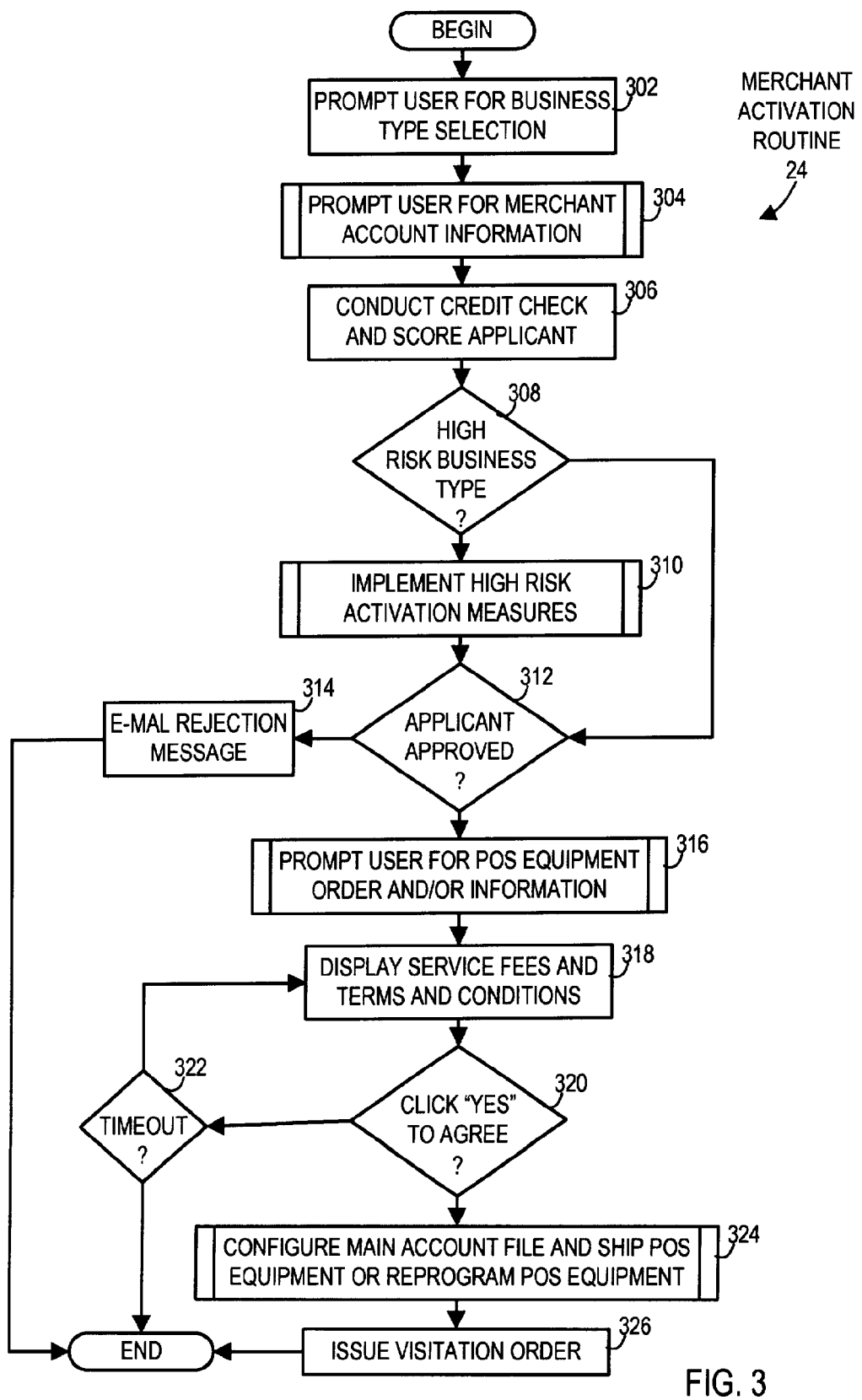
FIG. 3 is a logic flow diagram illustrating the operation of a merchant account activation routine.

FIG. 3 is a logic flow diagram illustrating the operation of a merchant account activation routine 24. In step 302, the merchant account activation routine 24 prompts the applicant to enter a business type selection. This prompt may ask the user to type a business type designation into a data field or, alternatively, may ask the user to select from a number of predefined business types or groups of business types. For example, the merchant account activation routine 24 may list the business types by standard industry code (SIC) definitions. In addition, the merchant account activation routine 24 may list groups of SIC definitions in which each SIC definition a particular group has a similar assigned credit risk. That is, the merchant account activation routine 24 may group SIC definitions into credit risk groups, and ask the user to select among the credit risk groups. The merchant account activation routine 24 may then apply different or additional activation measures based on the credit risk group selected by the user.

The display screens illustrated in FIGS. 8 and 9 illustrate an example of the use of SIC definitions in the assignment of credit risk groups. In this particular example, a first credit risk group shown on FIG. 8 includes furniture stores and other SIC definitions, and a second credit risk group shown on FIG. 9 includes restaurant or food store and other SIC definition. In this particular example, the first credit risk group is considered "high risk," whereas the second credit risk is not considered "high risk." As a result, the application indicating the first credit risk group activates the "high risk measures" illustrated in FIG. 5, whereas an application indicating the second credit risk group does not activate these "high risk measures."

Those skilled in the art will appreciate that many other types of menu and display screen structures may be used to obtain and group business type information. For example, a long list of SIC definitions may be presented in which each SIC definition includes a box or circle for clicking in a selection indicator. Alternatively, a list of credit risk groups may be presented in which each SIC definition includes a box or circle for clicking in a selection indicator. Any other suitable type of menu or display screen may be used to obtain this or any other type of information gathered by the merchant activation routine 24.

Step 302 is followed by routine 304, in which the merchant activation routine 24 prompts the applicant to enter merchant account information. This process is described in greater detail with reference to FIG. 4. In addition, FIGS. 9–18 show the display screens employed by the merchant activation routine 24 to prompt the applicant for this information. Routine 304 is followed by step 306, in which the merchant activation routine 24 conducts a credit check and scores the applicant as a credit risk. For example, the credit scoring routine may use a different "score-card" or credit scoring routine based on the SIC business type input by the applicant (i.e., dynamic application of score-card based on SIC). The credit check typically involves an electronic query of a credit service computer, such as that operated by the EQUIFAX credit service company or another similar system. Processes for conducting this credit check and scoring the applicant as a credit risk are well known in the art and will not be further described in this specification, except to note that these processes are automatically implemented by the merchant activation routine 24 without human intervention during the course of the on-line session between the merchant computer 18 and the acquirer Internet server 22.

Step 306 is followed by step 308, in which the merchant activation routine 24 determines whether the application is for a high risk business type. This determination is typically based on the business type designation selected by the applicant, the application information (e.g., sales data), the credit check information obtained from the credit service company, or a combination of the these factors. In particular, all of this information is typically reflected in the credit risk score computed in step 306, and the decision of step 308 may be based entirely on the basis of this score. Other factors may also be taken into account in the decision of step 308, such as applicant's location (e.g., flood risk, crime risk, fraud risk, permanence of establishment), the credit rating of the owners, the presence of a bond or insurance to pay creditors in the event of an interruption in the operation of the business. In particular, it is desirable to identify very temporary "hit-and-run break-out fraud" types of establishments as very "high risk." Those skilled in the art will appreciate that many other types of statistical and actuarial factors may be considered in scoring the applicant as a credit risk.

If the business is classified as a "high risk" business type, the "YES" branch is followed from step 308 to routine 310, in which the merchant activation routine 24 implements high risk measures. These high risk measures are described with reference to FIG. 5. Routine 310 and the "NO" branch from step 308 are followed by step 312, in which the merchant activation routine 24 determines whether the application is approved. That is, some credit risks are too high and will not be approved by the merchant activation routine 24. In this case, the applicant may elect to talk to a personal representative of the acquirer to determine whether special arrangements can be made for a merchant account under the particular risk conditions. If the application is not approved, the "NO" branch is followed to step 314, in which the merchant activation routine 24 e-mails a rejection message to the applicant. Alternatively, a rejection message could be displayed immediately by the merchant activation routine 24, or a rejection letter could be generated and mailed to the applicant, or some other type of notification could be implemented. Step 314 is followed by the "END" step, which concludes the merchant activation routine 24.

If the application is approved, the "YES" branch is followed from step 312 to routine 316, in which the merchant activation routine 24 prompts the user to select or specify one or more point-of-sale terminals for use in connection with the merchant account. This process is described in greater detail with reference to FIG. 6. In addition, FIG. 19 shows the display screen employed by the merchant activation routine 24 to prompt the user to select or specify the point-of-sale terminals. Basically, the applicant must specify at least one point-of-sale terminal 16 and an associated telephone number for use in connection with the merchant account so that the MIDMD and telephone information maintained in the merchant's point-of-sale terminal is consistent with that maintained in the acquirer's master account file 28. The process of accomplishing this result is know as "activating" the merchant account for credit-card transactions.

Routine 316 is followed by step 318, in which the merchant activation routine 24 displays a service fee schedule and related terms and conditions for the merchant account. The particulars of the service fee schedule and related terms and conditions may be varied in response to the applicant's credit risk score and/or business type designation. Step 318 is followed by step 320, in which the merchant activation routine 24 determines whether the applicant has clicked a "YES" control item indicating acceptance of the fee schedule and related terms and conditions. In addition, an electronic signature or other type of legally-binding electronic indication may be required to create a binding legal contract between the merchant and the acquirer. Alternatively or additionally, a paper contract may be forwarded to the merchant for signature to memorialize the contract between the merchant and the acquirer.

If the applicant does not click "YES" to agree to the fee schedule and the terms and conditions, the "NO" branch is followed from step 320 to step 322, in which the merchant activation routine 24 or the applicant's browser may timeout. If a timeout has not occurred, the "NO" branch loops the step 318, in which the merchant activation routine 24 continues to wait for the applicant to click "YES" to accept. If a timeout has occurred, the "YES" branch is followed to the "END" step, which concludes routine 24.

If the applicant does click "YES" to agree to the fee schedule and the terms and conditions, the "YES" branch is followed from step 320 to routine 324, in which the merchant activation routine 24 directly or indirectly configures the master account file 28 with MID/TID identification information for the new merchant account. Also in routine 324, the merchant activation routine 24 schedules configuration of the point-of-sale terminal 16, either on-site for shipment to the merchant or remotely over the telephone system. Routine 324 is described in greater detail with reference to FIG. 7.

Routine 324 is followed by step 326, in which the merchant activation routine 24 issues a visitation order to the visitation department or company 34. This entity typically makes a physical visit to the merchant's premises 12 to verify that the applicant requesting the merchant account actually exists and appears to be in the identified business. The visitation department or company 34 then returns a verification indicating that the visitation has occurred and whether the applicant appears to be in the identified business. The acquirer typically enters the visitation verification into the merchant's record in the master account file 28 to complete the record. Step 326 is followed by the "END" step, which concludes the merchant activation routine 24.

Figure 4:
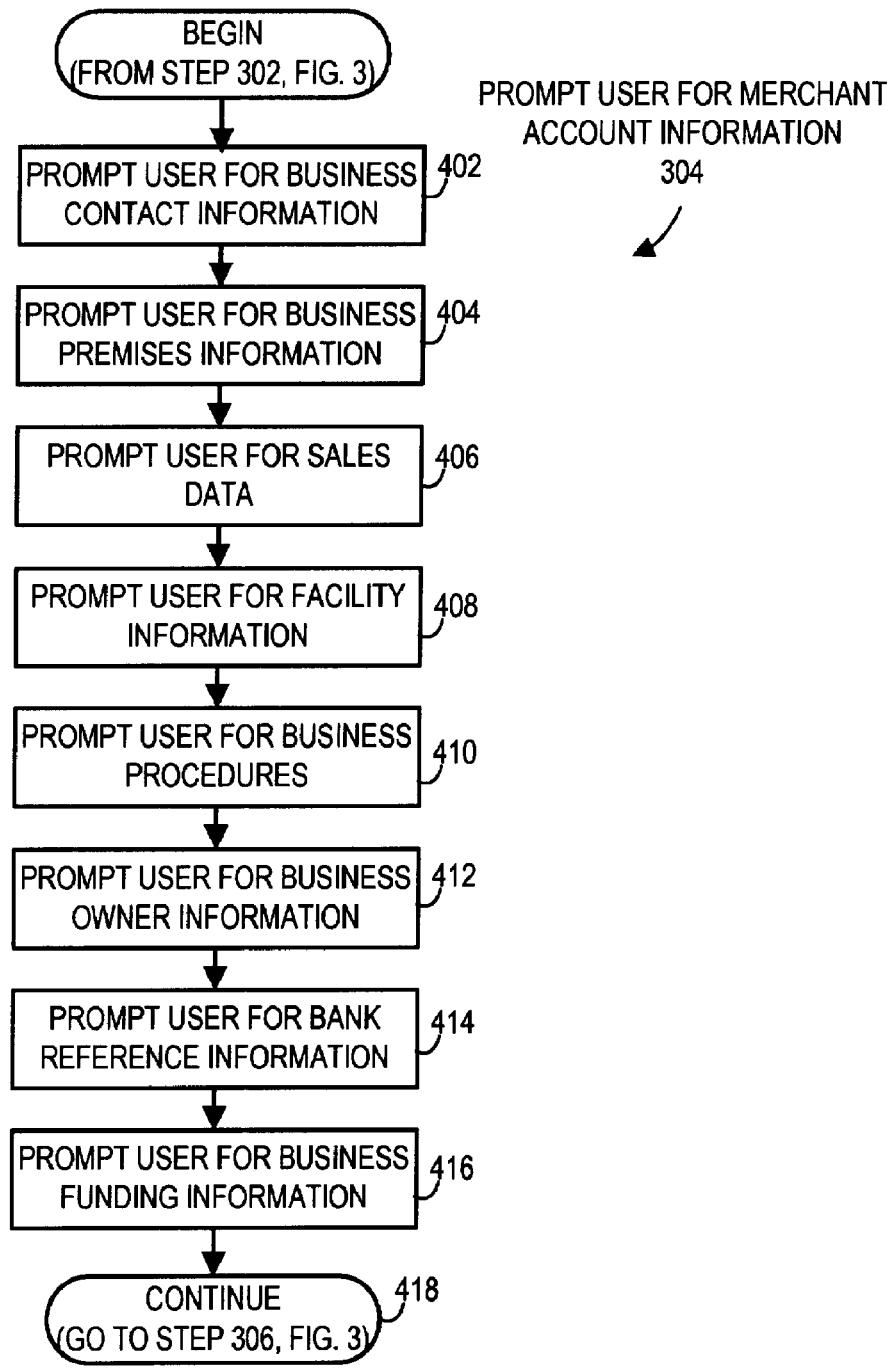
FIG. 4 is a logic flow diagram illustrating a routine for obtaining merchant account information in a merchant account activation routine.

FIG. 4 is a logic flow diagram illustrating routine 304 for obtaining merchant account information. Routine 304 begins following step 302 shown on FIG. 3. In step 402, the merchant activation routine 24 prompts the applicant to enter business contact information. FIG. 10 illustrates a display screen that may be used to prompt the user to enter this information. Step 402 is followed by step 404, in which the merchant activation routine 24 prompts the applicant to enter business premises information. FIG. 11 illustrates a display screen that may be used to prompt the user to enter this information. Step 404 is followed by step 406, in which the merchant activation routine 24 prompts the applicant to enter sales data. FIG. 12 illustrates a display screen that may be used to prompt the user to enter this information.

Step 406 is followed by step 408, in which the merchant activation routine 24 prompts the applicant to enter facility information. FIG. 13 illustrates a display screen that may be used to prompt the user to enter this information. Step 408 is followed by step 410, in which the merchant activation routine 24 prompts the applicant to enter business procedure information. FIG. 14 illustrates a display screen that may be used to prompt the user to enter this information. Step 410 is followed by step 412, in which the merchant activation routine 24 prompts the applicant to enter business owner information. FIG. 15 illustrates a display screen that may be used to prompt the user to enter this information. Step 412 is followed by step 414, in which the merchant activation routine 24 prompts the applicant to enter bank reference information. FIG. 16 illustrates a display screen that may be used to prompt the user to enter this information. Step 414 is followed by step 416, in which the merchant activation routine 24 prompts the applicant to enter funding information. FIG. 17 illustrates a display screen that may be used to prompt the user to enter this information. Step 416 is followed by the "CONTINUE" step 418, which returns to step 306 shown on FIG. 3.

Figure 5:
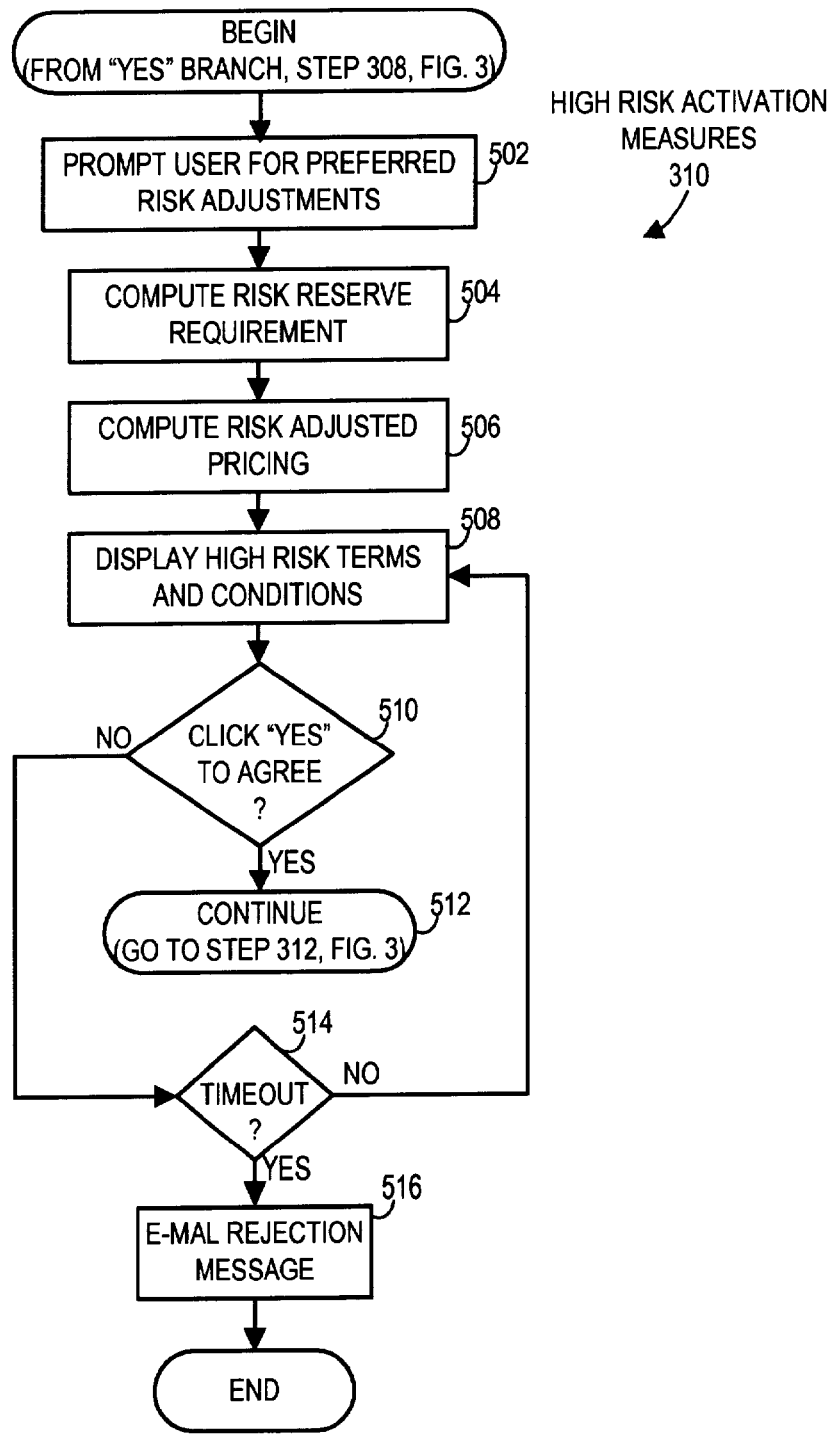
FIG. 5 is a logic flow diagram illustrating a routine for activating high risk measures in a merchant account activation routine.

FIG. 5 is a logic flow diagram illustrating routine 310 for activating high risk measures. Routine 310 begins following step 308 shown on FIG. 3. In step 502, the merchant activation routine 24 prompts the applicant to select a preferred type of risk adjustment. Typically, the merchant activation routine 24 displays a list of risk associated risk adjustment measures with associated click boxes or circles. The applicant may click to indicate one or more preferred risk adjustment measures. For example, the risk adjustment measures illustrated in FIG. 5 include holding a reserve fund and increasing the fees. Some applicants may be willing to maintain a substantial reserve fund with the acquirer, whereas others may prefer to pay higher risk-adjusted fees. Others may prefer a mix of these measures. Other risk adjustment measures may include obtaining insurance, a co-signatory, or maintaining a bond to cover any unrecoverable fees. Those skilled in the art may ascertain other risk adjustment measures that may be used in connection with the merchant activation routine 24. By obtaining the applicant's preference with respect to risk adjustment, the acquirer may be accommodate this preference in whole or in part.

Step 502 is followed by step 504, in which the merchant activation routine 24 computes a reserve requirement for the applicant. Step 504 is followed by step 506, in which the merchant activation routine 24 computes a risk adjusted pricing requirement for the applicant. As noted above, the applicant's credit risk score and preference for risk adjustment measures are preferably taken into account when computing these risk adjustment measures. Step 506 is followed by step 508, in which the merchant activation routine 24 displays the high risk terms and conditions, including the risk adjustment measures, to the applicant for acceptance.

Step 508 is followed by step 510, in which the merchant activation routine 24 determines whether the applicant has clicked a "YES" control item indicating acceptance of the risk adjusted fee schedule and related terms and conditions. In addition, an electronic signature or other type of legally-binding electronic indication may be required to create a binding legal contract between the merchant and the acquirer. Alternatively or additionally, a paper contract may be forwarded to the merchant for signature to memorialize the contract between the merchant and the acquirer.

If the applicant does not click "YES" to agree to the fee schedule and the terms and conditions, the "NO" branch is followed from step 510 to step 514, in which the merchant activation routine 24 or the applicant's browser may timeout. If a timeout has not occurred, the "NO" branch loops the step 508, in which the merchant activation routine 24 continues to wait for the applicant to click "YES" to accept. If a timeout has occurred, the "YES" branch is followed to step 516, in which the merchant activation routine 24 e-mails a rejection message to the applicant. Alternatively, a rejection message could be displayed immediately by the merchant activation routine 24, or a rejection letter could be generated and mailed to the applicant, or some other type of notification could be implemented. Step 516 is followed by the "END" step, which concludes routine 310.

Figure 6:
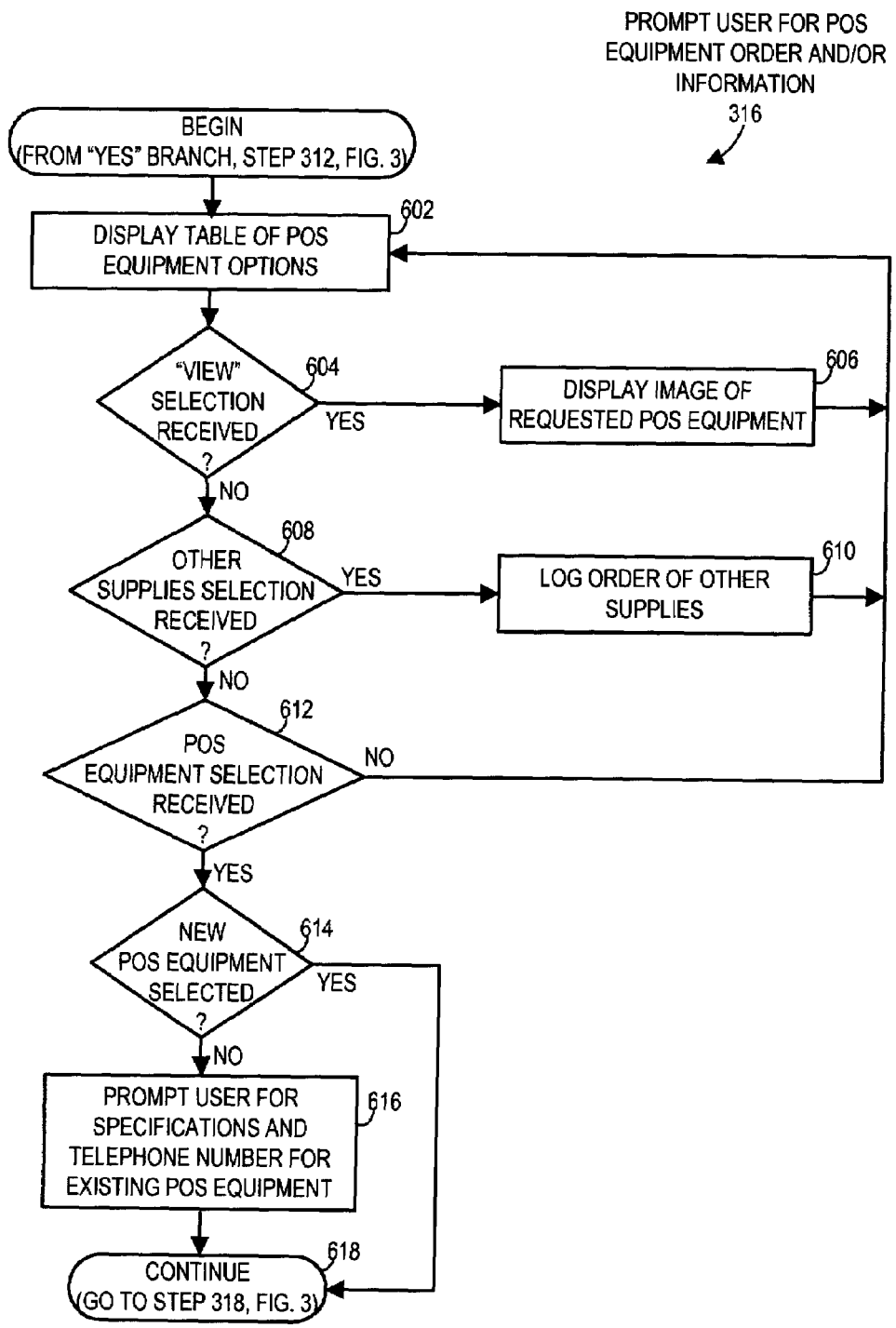
FIG. 6 is a logic flow diagram illustrating a routine for accepting a point-of-sale terminal order in a merchant account activation routine.

FIG. 6 is a logic flow diagram illustrating routine 316 for accepting a point-of-sale terminal order or identification of a point-of-sale terminal that is already in the possession of the merchant. Routine 316 follows the "YES" branch from step 312 shown on FIG. 3. In step 602, the merchant activation routine 24 displays a table of point-of-sale terminal options. This table is illustrated in FIG. 19. Selection of the "Lease" option indicates a point-of-sale terminal to be shipped to the merchant, whereas selection of the "Customer Owned" option indicates a terminal that is already in the merchant's possession. In the table, each point-of-sale terminal option is displayed in association with a "view" control item.

Step 602 is followed by step 604, in which the merchant activation routine 24 determines whether it has received a selection of a "view" control item. If the "view" control item has been selected, the "YES" branch is followed to step 606, in which the merchant activation routine 24 displays an image of the associated point-of-sale terminal. From step 606, the merchant activation routine 24 loops to step 602 and continues display of the table of point-of-sale terminal options.

If the "view" control item has not been selected, the "NO" branch is followed from step 604 to step 608, in which the merchant activation routine 24 determines whether the applicant has selected a control option for ordering supplies. If the control option for ordering supplies has been selected, the "YES" branch is followed to step 610, in which the merchant activation routine 24 displays a selection display screen, or a series of selection display screens, that allow the applicant to order supplies. For example, the merchant activation routine 24 may allow the applicant to order credit-card receipts and rolls of paper for use with the point-of-sale terminals. Optionally, the merchant may purchase other goods and services during the on-line session, such as software for operating an on-line store, information relating to financing alternatives, cash registers, customized stationary, and a wide variety of other supplies and information related to the operation of the merchant's business. In step 610, the merchant activation routine 24 logs the supplies ordered for shipment to the merchant. From step 610, the merchant activation routine 24 loops to step 602 and continues display of the table of point-of-sale terminal options.

If the control option for ordering supplies has not been selected, the "NO" branch is followed from step 608 to step 612, in which the merchant activation routine 24 determines whether the applicant has ordered new point-of-sale equipment or has specified the use of point-of-sale equipment that is already in the applicant's possession. As noted previously, this is indicated by the selection of a "Lease" option for new point-of-sale equipment or a "Customer Owned" option for point-of-sale equipment that is already in the applicant's possession. It will be understood that an applicant may alternatively specify both options. That is, the applicant may use some existing point-of-sale terminals and order some new ones using the merchant activation routine 24.

If the applicant has not ordered a new point-of-sale terminal, the "NO" branch is followed from step 614 to step 616, in which the merchant activation routine 24 prompts the applicant to enter the terminal specification and the telephone number assigned to the terminal. The "YES" branch from step 614 and step 616 is followed by the "CONTINUE" step, which returns to step 318 shown on FIG. 3. However, the merchant activation routine 24 may also prompt the applicant for a telephone number for use in connection with a new point-of-sale terminal before exiting routine 316. In this case, the point-of-sale terminal will be shipped with its assigned telephone directory number already configured into the terminal. Alternatively, the point-of-sale terminal may be shipped without its assigned telephone directory number, and the applicant may configure the point-of-sale terminal with its assigned telephone directory upon receipt of the terminal. In this case, the point-of-sale terminal downloads its assigned telephone directory number to the acquirer's main computer 26 upon establishing an initial communication over the telephone network 40. In either case, this information is stored in the applicant's record in the master account file 28.

Figure 7:
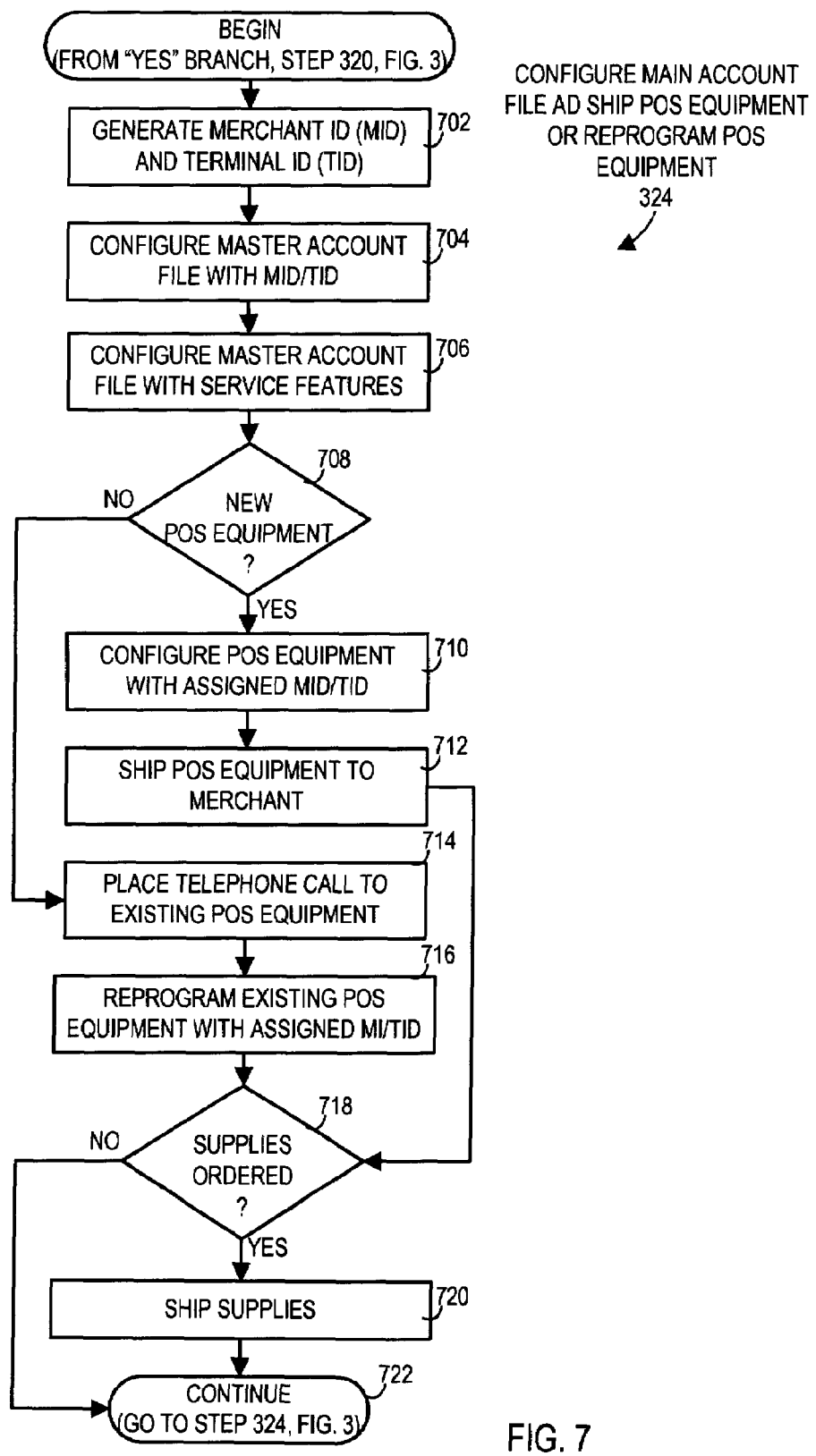
FIG. 7 is a logic flow diagram illustrating a routine for configuring a master account file and a point-of-sale terminal in a merchant account activation routine.

FIG. 7 is a logic flow diagram illustrating routine 324 for configuring the master account file 28 and the point-of-sale terminal 16. Routine 324 follows the "YES" branch from step 320 shown on FIG. 3. In step 702, the merchant activation routine 24 may generate the MID/TID identification information, or alternatively the merchant activation routine 24 may trigger the main computer 26 to generate the MID/TID identification information. In either case, step 702 is followed by step 704, in which the identification information is configured into the master account file 26. Step 704 is followed by step 706, in which the service features are configured into the master account file 26.

Step 706 is followed by step 708, in which the merchant activation routine 24 determines whether the applicant has ordered new point-of-sale equipment. If the applicant has ordered new point-of-sale equipment, the "YES" branch is followed step 710, in which the merchant activation routine 24 schedules the point-of-sale terminal for configuration by a technician using the expert computer system 30. Alternatively, this step could be automated for performance by the expert computer system 30 without the intervention of the technician. Step 710 is followed by step 712, in which the technician or the expert computer system 30 ships the point-of-sale terminal to the merchant.

Referring again to step 708, if the applicant has not ordered new point-of-sale equipment, the "NO" branch is followed step 714, in which the merchant activation routine 24 schedules the remote reprogramming of the merchant's point-of-sale terminal. A technician using the expert computer system 30 subsequently places a telephone call to the merchant's point-of-sale terminal. Alternatively, this step could be automated for performance by the expert computer system 30 without the intervention of the technician. In addition, this step could be performed in "real time" during the on-line session. In each case, step 714 is followed by step 716, in which the technician or the expert computer system 30 reprograms the merchant's point-of-sale terminal with the assigned MID/TID identification information. Other data, such as an updated operating system and/or encryption software, may also be downloaded onto the point-of-sale terminal at this time.

Steps 712 and 716 are followed by step 718, in which the merchant activation routine 24 determines whether the applicant has ordered other supplies. If the applicant has ordered other supplies, the "YES" branch is followed to step 720, in which the merchant activation routine 24 cause a technician or an expert computer system to fill the order and ship the supplies. Step 720 and the "NO" branch from step 718 are followed by the "CONTINUE" step 722, which returns to step 324 shown on FIG. 3.

FIGS. 8–21 illustrate display screens for an application for a merchant account. The process of receiving information from the applicant completing the application for the merchant account may include prompting the user to enter business contact information, business premises information, business sales data, business owner information, and information relating to funding for the charges associated with administering the merchant account. FIG. 8 is an illustration of a display screen for receiving a business type designation in a merchant account activation routine. A merchant operating a merchant computer 18 initiates an on-line session between the Internet server 22 and the merchant computer 18. The Internet server 22 displays an opening display screen 800 for the merchant. The opening display screen 800 introduces the merchant to the process for completing an application for opening a merchant account. Typically, the opening display screen is the first of a series of display screens or webpages containing data fields, push buttons, radio buttons, pull down boxes, check boxes, and the like. After the merchant has read the opening display screen 800, the merchant is prompted by a "Continue" push button 802 and a "Cancel" push button 804. If the merchant clicks the "Continue" push button 802, the Internet server 22 continues the application process as described in FIGS. 9–21. However, if the merchant clicks the "Cancel" push button 804, the Internet server 22 discontinues the application process, and the Internet server 22 returns the merchant to a home page.

The opening display screen 800 contains one or more links 806 to other display screens or web pages containing relevant information. For example, a link 806 to learn more about potential business type categories can be helpful to the merchant's decision in selecting point-of-sale equipment. When the merchant clicks upon the link 806, one or more additional display screens or web pages illustrate potential business type categories offered by the system.

FIG. 9 is an illustration of a display screen stating business type conditions in a merchant account activation routine. After the merchant clicks the "Continue" push button 802, as shown in FIG. 8, the Internet server 22 continues the application process by displaying a business type conditions screen 900 explaining the different business type conditions needed to activate a merchant account. For example, a business type condition screen 900 can explain minimum conditions required to activate a merchant account, such as requiring the merchant to at least 18 years of age.

After the merchant has read the business type condition screen 900, the merchant is prompted by a "Continue" push button 902 and a "Cancel" push button 904. If the merchant clicks the "Continue" push button 902, the Internet server 22 continues the application process as described in FIGS. 10–21. However, if the merchant clicks the "Cancel" push button 904, the Internet server 22 discontinues the application process, and the Internet server 22 returns the merchant to a home page.

The business type condition screen 900 contains one or more links 906–910 to other display screens or web pages containing relevant information. For example, if the merchant does not see a matching business type, a link 906 to explain the potential business type categories can be helpful to the merchant's decision in selecting point-of-sale equipment. When the merchant clicks upon the link 906, one or more additional display screens or web pages offer greater information and detail about the potential business type categories offered by the system.

FIG. 10 is an illustration of a display screen for receiving business contact information in a merchant account activation routine. After the merchant clicks the "Continue" push button 902, as shown in FIG. 9, the Internet server 22 continues the application process by displaying a business contact information input screen 1000 permitting the merchant to input business contact information data into one or more preselected data fields 1002–1030 or blanks.

For example, data fields 1002–1030 can prompt the merchant to enter business contact information as follows. Field 1002 prompts the merchant to enter a business name. Field 1004 prompts the merchant to enter a legal business name. Field 1006 prompts the merchant to enter a street address. Field 1008 prompts the merchant to enter a city for the street address. Field 1010 prompts the merchant to enter a state for the street address. Field 1012 prompts the merchant to enter a postal zip code. Filed 1014 prompts the merchant to enter a name of an authorized contract signer. Field 1016 prompts the merchant to enter a title, such as treasurer, for the authorized contract signer by clicking on and pulling down a pull down box menu. Field 1018 prompts the merchant to enter a telephone number. Field 1020 prompts the merchant to enter a facsimile or fax number. Field 1022 prompts the merchant to enter special "attention to" information. Field 1024 prompts the merchant to enter an e-mail address. Field 1026 prompts the merchant to enter a WEB store e-mail address. Field 1028 prompts the merchant to enter a type of business, such as an auto parts store, by clicking on and pulling down a pull down box menu. Field 1030 prompts the merchant to enter a business category, such as retail, by clicking on and pulling down a pull down box menu.

After the merchant has input data into a predetermined minimum number of fields 1002–1030, the merchant computer 18 sends the merchant's data to the Internet server 22. The Internet server 22 receives the merchant's data from the business contact information input screen 1000 and continues the application process as described in FIGS. 11–21. The predetermined minimum number of fields can be adjusted according to the necessary information required by the system to process and activate a merchant account. If the merchant does not enter data or information into the predetermined minimum number of fields, then the Internet server returns the user back to the business contact information input screen 1000 until data or information is input into the minimum number of fields. For example, the selected data fields or blanks comprising the predetermined minimum number of fields for the business contact information input screen 1000 are designated by the "*" next to selected data fields or blanks.

FIG. 11 is an illustration of a display screen for receiving business premises information in a merchant account activation routine. The Internet server 22 continues the application process by displaying a business premises information input screen 1100 permitting the merchant to input business premises information data into one or more preselected data fields 1102–1116 or blanks.

For example, data fields 1102–1116 can prompt the merchant to enter business premises information as follows. Field 1102 prompts the merchant to enter a business zone, such as a business district, by clicking on and pulling down a pull down box menu. Field 1104 prompts the merchant to enter a general business location, such as shopping mall, by clicking on and pulling down a conventional scroll-down menu. Field 1106 prompts the merchant to enter business organization or ownership type, such as a sole proprietorship, by clicking on and pulling down a pull down box menu. Field 1108 prompts the merchant to enter a state of incorporation. Field 1110 prompts the merchant to enter a federal tax identification number or a social security number if the business is unincorporated. Field 1112 prompts the merchant to enter a date when the business first began. Filed 1114 prompts the merchant to enter the size of the business by number employees. Field 1116 prompts the merchant to a short description of what goods or services the business sells to consumers.

After the merchant has input data into a predetermined minimum number of fields 1102–1116, the merchant computer 18 sends the merchant's data to the Internet server 22. The Internet server 22 receives the merchant's data from the business premises information input screen 1100 and continues the application process as described in FIGS. 12–21.

FIG. 12 is an illustration of a display screen for receiving business sales data in a merchant account activation routine. The Internet server 22 continues the application process by displaying a business sales data and information input screen 1200 permitting the merchant to input business sales data and information into one or more preselected data fields 1202–1214 or blanks.

For example, data fields 1202–1214 can prompt the merchant to enter business sales data and information as follows. Filed 1202 prompts the merchant to enter a total cash and credit sales amount. Field 1204 prompts the merchant to enter a local or state sale tax percentage. Field 1206 prompts the merchant to select the merchant's credit card refund policies, such as exchange, store credit, or refund, by clicking on a corresponding check box. If a refund is offered under the merchant's credit card refund policies, then field 1208 permits the merchant to select the time period to submission, such as 0–3 days, by clicking on and pulling down a pull down box menu. Field 1210 prompts the merchant to enter credit card sales submission information, such as the date of order, by clicking on and pulling down a pull down box menu. Field 1212 prompts the merchant to enter an amount of annual credit card sales. Field 1214 prompts the merchant to enter an average sales amount.

After the merchant has input data into a predetermined minimum number of fields 1202–1214, the merchant computer 18 sends the merchant's data to the Internet server 22. The Internet server 22 receives the merchant's data from the business sales data and information input screen 1200 and continues the application process as described in FIGS. 13–21.

FIG. 13 is an illustration of a display screen for receiving business facility information in a merchant account activation routine. The Internet server 22 continues the application process by displaying a business premises information input screen 1300 permitting the merchant to input facility information data into one or more preselected data fields 1302–1306 or blanks.

For example, data fields 1302–1306 can prompt the merchant to enter business facility information as follows. Field 1302 prompts the merchant to check a box corresponding to the merchant's advertising name display, such as window, door, or store front, by clicking a corresponding box. Field 1304 prompts the merchant to select a store facility location, such as ground floor or other, by clicking a corresponding radio button. Field 1306 prompts the merchant to an amount of facility square footage, such as 250 square feet, by clicking on and pulling down a pull down box menu.

After the merchant has input data into a predetermined minimum number of fields 1302–1306, the merchant computer 18 sends the merchant's data to the Internet server 22. The Internet server 22 receives the merchant's data from the facility information input screen 1300 and continues the application process as described in FIGS. 14–21.

FIG. 14 is an illustration of a display screen for receiving business procedures information in a merchant account activation routine. The Internet server 22 continues the application process by displaying a business procedures information input screen 1400 permitting the merchant to input business procedures information or data into one or more preselected data fields 1402–1420 or blanks.

For example, data fields 1402–1420 can prompt the merchant to enter business procedures information as follows. Fields 1402–1406 prompt the merchant to enter a series of percentage numbers into data fields corresponding to the merchant's percentages of sales from particular sources, such as in store, mail or telephone order, and Internet, by entering an amount into a corresponding box. Fields 1408–1414 prompt the merchant to enter a series of percentage numbers into data fields corresponding to the merchant's percentages of product delivery times, such as 0–7 days, 8–14 days, 15–30 days, and 30+ days, by entering an amount into a corresponding box. Field 1416 prompts the merchant to enter how the merchant advertises, such as by brochure or mail, catalog, television or radio, and newspaper or magazine, by clicking on a corresponding check box. Field 1418 prompts the merchant to enter information disclosing the merchant's current credit card processor. Field 1420 prompts the merchant to enter information disclosing the credit card processor's telephone number.

At the lower portion of the business procedures display screen 1400, a navigation button bar 1422 presents the merchant buttons corresponding to application process steps, such as general info, business reference, funding info, choose processing types, order equipment, service fees, submit, and cancel. If the merchant selects one of the buttons in the navigation button bar 1422, a corresponding display page or webpage will be presented to the merchant. Examples of each of the application process step display pages or webpages are shown and described in FIGS. 8–21.

After the merchant has input data into a predetermined minimum number of fields 1402–1422, the merchant computer 18 sends the merchant's data to the Internet server 22. The Internet server 22 receives the merchant's data from the business procedures data or information input screen 1400 and continues the application process as described in FIGS. 15–21.

FIG. 15 is an illustration of a display screen for receiving business owner information in a merchant account activation routine. The Internet server 22 continues the application process by displaying an owner and business reference information input screen 1500 permitting the merchant to input owner and business reference information or data into one or more preselected data fields 1502–1540 or blanks.

For example, data fields 1502–1540 can prompt the merchant to enter owner and business reference information as follows. Fields 1502–1520 prompt the merchant to enter first owner, partner or officer information. Specifically, field 1502 prompts the merchant to enter a first name. Field 1504 prompts the merchant to enter a middle initial. Field 1506 prompts the merchant to enter a last name. Field 1508 prompts the merchant to enter a street address. Field 1510 prompts the merchant to enter a city for the street address. Field 1512 prompts the merchant to enter a state for the street address. Field 1514 prompts the merchant to enter a postal zip code for the street address. Field 1516 prompts the merchant to enter a title for the first owner, such as owner, by clicking on and pulling down a pull down box. Field 1518 prompts the merchant to enter a telephone number. Field 1520 prompts the merchant to enter a social security number. Fields 1522–1540 prompt the merchant to enter second owner, partner or officer information. Specifically, field 1522 prompts the merchant to enter a first name. Field 1524 prompts the merchant to enter a middle initial. Field 1526 prompts the merchant to enter a last name. Field 1528 prompts the merchant to enter a street address. Field 1530 prompts the merchant to enter a city for the street address. Field 1532 prompts the merchant to enter a state for the street address. Field 1534 prompts the merchant to enter a postal zip code for the street address. Field 1536 prompts the merchant to enter a title for the first owner, such as owner, by clicking on and pulling down a pull down box. Field 1538 prompts the merchant to enter a telephone number. Field 1540 prompts the merchant to enter a social security number.

After the merchant has input data into a predetermined minimum number of fields 1502–1540, the merchant computer 18 sends the merchant's data to the Internet server 22. The Internet server 22 receives the merchant's data from the owner or business references information input screen 1500 and continues the application process as described in FIGS. 16–21.

FIG. 16 is an illustration of a display screen for receiving business bank reference information in a merchant account activation routine. The Internet server 22 continues the application process by displaying an bank reference information input screen 1600 permitting the merchant to input bank reference information or data into one or more preselected data fields 1602–1624 or blanks.

For example, data fields 1602–1624 can prompt the merchant to enter bank reference information as follows. Field 1602 prompts the merchant to enter a bank name. Field 1604 prompts the merchant to enter a street address. Field 1606 prompts the merchant to enter a city for the street address. Field 1608 prompts the merchant to enter a state for the street address. Field 1610 prompts the merchant to enter a postal zip code for the street address. Field 1612 prompts the merchant to enter a telephone number. Field 1614 prompts the merchant to enter a bank contact name. Field 1616 prompts the merchant to enter a date indicating when the bank relationship began. Field 1618 prompts the merchant to indicate whether the merchant is a borrower, such as a yes or no response, by selecting a corresponding radio button. Field 1620 prompts the merchant to enter an amount indicating the average balance held by the bank. Field 1622 prompts the merchant to enter an amount indicating the total loan/credit facilities. Field 1624 prompts the merchant to enter an amount indicating the total of other business/personal account finances.

After the merchant has input data into a predetermined minimum number of fields 1602–1624, the merchant computer 18 sends the merchant's data to the Internet server 22. The Internet server 22 receives the merchant's data from the bank reference information input screen 1600 and continues the application process as described in FIGS. 17–21.

FIG. 17 is an illustration of a display screen for receiving business funding information in a merchant account activation routine. The Internet server 22 continues the application process by displaying an bank reference information input screen 1700 permitting the merchant to input funding information or data into one or more preselected data fields 1702–1704 or blanks.

For example, data fields 1702–1704 can prompt the merchant to enter funding information as follows. Field 1702 prompts the merchant to enter an American Banker's Association (ABA) number. The merchant activation routine 24 includes a control, such as a look-up to a database of valid ABA numbers, to ensure that the applicant has entered a valid ABA number. The merchant activation routine 24 will not process the application unless it receives a valid ABA number. The database of valid ABA numbers is typically updated daily, and the applicant may be given one or more opportunities to enter a valid ABA number. Field 1704 prompts the merchant to enter a Demand Deposit Account (DDA) number.

After the merchant has input data into a predetermined minimum number of fields 1702–1704, the merchant computer 18 sends the merchant's data to the Internet server 22. The Internet server 22 receives the merchant's data from the funding information input screen 1700 and continues the application process as described in FIGS. 18–21.

FIG. 18 is an illustration of a display screen for receiving transaction processing type information in a merchant account activation routine. The Internet server 22 continues the application process by displaying a bank reference information input screen 1800 permitting the merchant to input credit card processing information or data into one or more preselected data fields 1802–1822 or blanks.

For example, data fields 1802–1822 can prompt the merchant to enter credit card processing information as follows. Fields 1802–1814 prompt the merchant to select a credit card type, such as Mastercard, VISA, American Express, Discover, Diner's Club, JCB, or a debit card, by clicking on a corresponding check box. If the merchant selects American Express as a credit card type, the fields 1816–1818 prompt the merchant for further information regarding the desired American Express account, such as the need to apply for an American Express account or having an pre-existing account, by clicking on a corresponding radio button. If the merchant indicates that a pre-existing account has been opened, then field 1820 prompts the user to enter the existing account number. Similarly, if the merchant selects Discover as a credit card type, then field 1822 prompts the user to enter the existing account number.

At the lower portion of the credit card processing display screen 1800, a navigation button bar 1824 presents the merchant buttons corresponding to application process steps, such as general info, business reference, funding info, choose processing types, order equipment, service fees, submit, and cancel. If the merchant selects one of the buttons in the navigation button bar 1824, a corresponding display page or webpage will be presented to the merchant. Examples of each of the application process step display pages or webpages are shown and described in FIGS. 8–21.

After the merchant has input data into a predetermined minimum number of fields 1802–1822, the merchant computer 18 sends the merchant's data to the Internet server 22. The Internet server 22 receives the merchant's data from the credit card processing information input screen 1800 and continues the application process as described in FIGS. 19–21.

FIG. 19 is an illustration of a display screen for receiving point-of-sale terminal information in a merchant account activation routine. The Internet server 22 continues the application process by displaying a point-of-sale terminal information input screen 1900 permitting the merchant to input credit card processing information or data into one or more preselected data fields 1902–1920 or blanks.

For example, data fields 1902–1920 can prompt the merchant to enter point-of-sale terminal information as follows. Field 1902 prompts the merchant to select an equipment lease or own option by clicking on a corresponding radio button. Fields 1904–1918 prompt the merchant to select an equipment option package displayed on the screen. Field 1920 prompts the merchant to select additional equipment such as an imprinter by clicking on a corresponding check box. Beside each field 1904–1918 is a table 1922 of options describing of each equipment option package, such as a model number, viewable images, lease price, availability of lease, whether the equipment can be customer-owned, and whether a debit option is available. Links 1924 to viewable images of particular equipment option packages or additional equipment can also be presented within the table 1922 or elsewhere on the display screen 1900. In response to selecting a link 1924, the merchant activation routine displays an image depicting the point-of-sale terminal associated with the selected view control item.

At the lower portion of the credit card processing display screen 1900, a navigation button bar 1926 presents the merchant buttons corresponding to application process steps, such as general info, business reference, funding info, choose processing types, order equipment, service fees, submit, and cancel. If the merchant selects one of the buttons in the navigation button bar 1926, a corresponding display page or webpage will be presented to the merchant. Examples of each of the application process step display pages or webpages are shown and described in FIGS. 8–21.

After the merchant has input data into a predetermined minimum number of fields 1902–1920, the merchant computer 18 sends the merchant's data to the Internet server 22. The Internet server 22 receives the merchant's data from the point-of-sale terminal information input screen 1900 and continues the application process as described in FIGS. 20–21.

FIG. 20 is an illustration of a display screen for stating a fee schedule in a merchant account activation routine. The Internet server 22 continues the application process by displaying a fee schedule information screen 2000 permitting the merchant to view fee schedule information by credit card type and by transaction description in one or more data tables 2002–2004.

For example, data tables 2002–2004 can show the merchant fee schedule information as follows. Data table 2002 displays rate information for particular credit card types.

Data table 2004 displays fee amounts for particular transaction descriptions. Other fee schedule information can be shown in the fee schedule information display screen 2000 depending upon the merchant's choices and selections made during the previous application process described in FIGS. 8–19.

At the lower portion of the fee schedule information display screen 2000, a navigation button bar 2006 presents the merchant buttons corresponding to application process steps, such as general info, business reference, funding info, choose processing types, order equipment, service fees, submit, and cancel. If the merchant selects one of the buttons in the navigation button bar 2006, a corresponding display page or webpage will be presented to the merchant. Examples of each of the application process step display pages or webpages are shown and described in FIGS. 8–21.

After the merchant has viewed the fee schedule information display screen 2000, the merchant can select one of the buttons in the navigation button bar 2006. For example, when the merchant has completed data input on the previously described application display screens shown in FIGS. 8–19, the merchant selects the "SUBMIT" button 2008 on the navigation button bar 2006. The "SUBMIT" button 2008 indicates to the system that the merchant has completed data input and is ready to complete the application process. The Internet server 22 receives the merchant's "SUBMIT" request and continues the application process as described in FIG. 21.

FIG. 21 is an illustration of a display screen for stating terms and conditions in a merchant account activation routine. The Internet server 22 continues the application process by displaying a terms and conditions screen 2100 explaining the contractual terms and conditions to the merchant desiring to activate a merchant account. For example, a terms and conditions screen 2100 can explain accounting and debiting practices, liability limits, termination provisions, dispute resolutions terms, and guarantee and warranty conditions.

Thus, the invention allows a merchant to activate a merchant account during a single on-line session. After completing the on-line application, the merchant can begin accepting credit-card transactions as soon as the associated point-of-sale terminal is received or reprogrammed, which may be the next business day. It should be understood that the foregoing pertains only to the preferred embodiments of the present invention, and that numerous changes may be made to the embodiments described herein without departing from the spirit and scope of the invention.

The invention claimed is:

1. A computer-controlled system for configuring a point-of-sale terminal for use in connection with a merchant account during an on-line session with an applicant for the merchant account, comprising:
    a network accessible acquirer Internet server that generates a network accessible merchant account activation application user interface online for access by an applicant for a merchant account via an online session with the applicant accessing the acquirer Internet server;
    a master account file for storing information corresponding to the merchant account; and
    an electronic connection to one or more point-of-sale terminals;
    wherein the acquirer Internet server:
        displays the merchant account activation application user interface to the applicant during the online session with the applicant;
        receives information input by the applicant to the merchant account activation application user interface;
        displays information via the user interface relating to one or more selectable point-of-sale terminals for selection by the applicant;
        receives information input by the applicant to the merchant account activation application user interface selecting a point-of-sale terminal for use in connection with the merchant account;
        determines terms and conditions applicable to the applicant's merchant account based on the received information;
        displays determined terms and conditions relaring to the administration of the merchant account to the applicant via the user interface;
        receives an indication of acceptance of the terms and conditions from the applicant input by the applicant to the merchant account activation application user interface;
        responsive to the indication of acceptance of the terms and conditions from the applicant during the on-line session, generates identification information associated with the merchant account and the point-of-sale terminal, the identification information comprising a merchant ID (MID) and a terminal ID (TID);
        stores information generated and received during the online session, including the identification information, in the aster account file for use in administration of the merchant account; and
        configures the selected point-of-sale terminal by loading the identification information from the master account file via the electronic connection to the selected point-of-sale terminal.

2. The system of claim 1, wherein the terms and conditions include a fee schedule for services relating to the administration of the merchant account.

3. The system of claim 1, wherein the point-of-sale terminal is loaded with the identification information and then shipped to the applicant.

4. The system of claim 1, wherein the point-of-sale terminal is already in possession of the applicant and is configured remotely by a telephone call to a telephone directory number associated with the point-of-sale terminal to reprogram the point-of-sale terminal with the identification information during the telephone call.

5. The system of claim 1, wherein the acquirer Internet server determines a credit risk score for the application and based on the credit risk score establishes the terms and conditions for the merchant account.

6. The system is of claim 1, wherein the acquirer Internet server conducts a credit risk score to determine whether to accept the application; and
    notifies the applicant whether the application has been accepted.

7. The system of claim 1, wherein the acquirer Internet server issues a visitation order requesting a physical visit to the premises of the applicant to verify that the applicant is conducting a type of business input by the applicant in the application.

8. The system of claim 1, wherein the ac Internet server:
    prompts the applicant to enter business contact information;
    prompts the applicant to enter business premises information;
    prompts the applicant to enter business sales data; and prompts the applicant to enter business owner information.

9. The system of claim 1, wherein the acquirer Internet server prompts the applicant to provide information relating to funding for the charges associated with administering the merchant account.

10. The system of claim 1, wherein the acquirer Internet server:
sends a menu of point-of-sale terminal options to the applicant for display via the user interface;
sends a view control item in association with each option for display via the user interface;
receives a user command input by the applicant via the user interface selecting a particular view control item; and
sends an image depicting the point-of-sale terminal associated with the selected view control item to the applicant for display via the user interface.

11. The system of claim 1, wherein the acquirer Internet server:
receives a business type designation from the applicant;
determines a business risk category associated with the business type designation; and
implements risk adjustment measures based on the business risk category associated with the business type designation.

12. The system of claim 11, wherein the acquirer Internet server:
sends a menu of risk adjustment measures to the applicant for display via the user interface;
receives a user command from the applicant input via the user interface indicating a preferred risk adjustment selection; and
implements the risk adjustment measures based on the preferred risk adjustment selection.

13. The system of claim 11, wherein the acquirer Internet server:
determines a reserve requirement;
sends the reserve requirement to the applicant for display via the user interface; and
receives a user command from the applicant input via the user interrface accepting the reserve requirement.

14. The system of claim 11, wherein the acquirer Internet server:
determines a risk-adjusted fee schedule;
sends the risk-adjusted fee schedule to the applicant for display via the user interface; and
receives a user command from the applicant input via the user interface accepting the risk-adjusted fee schedule.

15. The system of claim 1, wherein the information input by the applicant selecting a point-of-sale terminal for use in connection with the merchant account comprises information selecting a new terminal for the applicant or selecting an existing terminal already in possession of the applicant.

16. A computer-controlled system for configuring a point-of-sale terminal for use in connection with a merchant account during an on-line session with an applicant for a merchant account comprising:
a network accessible acquirer Internet server that generates a network accessible merchant account activation application user interface online for access by an applicant for a merchant account via an online session with the applicant accessing the acquirer Internet server;
a master account file for storing information corresponding to the merchant account; and
a electronic connection to one or more point-of-sale terminals;
wherein the acquirer Internet server:
displays the merchant account activation application user interface to the applicant during the online session with the applicant;
receives information input by the applicant to the merchant account activation application including type of business information, business contact information, business premises information, business sales data, business owner information, and information relating to finding for the charges associated with administering the merchant account;
displays a menu of point-of-sale terminal options and a view control item in association with each option to the applicant via the user interface;
receives a user command input by the applicant via the user interface selecting a particular view control item;
displays an image depicting the point-of-sale terminal associated with the selected view control item to the applicant via the user interface;
receives information input by the applicant via the user interface selecting a point-of-sale terminal for use in connection with the merchant account;
based on information input by the applicant, determines a credit risk score for the application;
determines the terms and conditions applicable to the applicant's merchant account including a fee schedule for the merchant account based on the credit risk score;
displays the determined terms and conditions relating to the administration of the merchant account to the applicant via the user interface;
receives an indication of acceptance of the terms and conditions input by the applicant via the user interface;
generates identification information associated with the merchant account and the selected point-of-sale terminal;
stores information generated and received during the online session, including the identification information, in the master account file for use in administration of the merchant account; and
electronically issues a visitation order requesting a physical visit to the premises of the applicant to verify that the applicant is conducting the type of business input by the applicant in the application.

17. The system of claim 16, wherein the selected point-of-sale terminal is loaded with the identification information via the electronic connection and shipped to the applicant.

18. The system of claim 16, wherein the point-of-sale terminal is already in possession of the applicant and is configured remotely by a telephone call to a telephone directory number associated with the point-of-sale terminal to load the point-of-sale terminal with the identification information during the telephone call.

19. A computer-controlled system for configuring a point-of-sale terminal for use in connection with a merchant account during an on-line session with an applicant for a merchant account comprising:
a network accessible acquirer Internet server that generates a network accessible merchant account activation application user interface online for access by an applicant for a merchant account via an online session with the applicant accessing the acquirer Internet server;
a master account file for storing information corresponding to the merchant account; and an electronic connection to one or more point-of-sale terminals;

wherein the acquirer Internet server:

receives a business type designation input by the applicant via the merchant account activation application user interface;

determines a business risk category associated with the business type designation input by the applicant;

determines risk adjustment measures comprising a reserve requirement and a risk-adjusted fee schedule for services related to administration of the merchant account based on the business risk category associated with the business type designation;

displays terms and conditions relating to the risk adjustment measures to the applicant via the user interface;

receives an indication of acceptance of the terms and conditions input by the applicant via the user interface;

generates identification information associated with the merchant account and the point-of-sale terminal, the identification information comprising a merchant ID (MID) and a terminal ID (TID) associated with a selected point-of-sale terminal;

stores information generated and received during the online session, including the identification information and the risk adjustment measures, in the master account file for administration of the merchant account; and configures the selected point-of-sale terminal by loading the identification information from the master account file into the selected point-of-sale terminal via the electronic connection.

20. The system of claim 19 wherein acquirer Internet server:

receives information from the applicant via the user interface selecting a point-of-sale terminal for use in connection with the merchant account; and loads the selected point-of-sale terminal with the identification information.

21. A computer-readable storage medium containing a set of instructions executable by a computer for causing the computer to perform a method for configuring a point-of-sale terminal for use in connection with a merchant account, the method comprising the steps of:

generating a network accessible merchant account activation application for online access by an applicant for a merchant account during an online session with the applicant;

during the on-line session with the applicant for a merchant account, receiving information input by the applicant to the merchant account activation application, receiving information input by the applicant to the merchant account activation application selecting a point-of-sale terminal for use in connection with the merchant account, based on the received information, determining terms and conditions applicable to the applicant's merchant account upon acceptance of the merchant account activation application;

displaying such determined terms and conditions to the applicant relating to the administration of the merchant account;

receiving an indication of acceptance of the terms and conditions input by the applicant to the merchant account activation application;

in response to the indication of acceptance of the terms and conditions from the applicant and during the on-line session, generating identification information associated with the merchant account and the point of sale terminal, the identification information comprising a merchant ID (MID) and a terminal ID (TID);

storing information generated and received during the online session, including the identification information in a master account file for administration of the merchant account; and configuring the selected point of sale terminal by loading the identification information from the master account file into the selected point-of-sale terminal.

22. A computer-readable storage medium containing a set of instructions executable by a computer for causing the computer to perform a method for configuring a point-of-sale terminal for use in connection with a merchant account, during an on line session with an applicant for a merchant account, the method comprising the steps of:

generating a network accessible merchant account activation application for online access by an applicant for a merchant account during an online session with the applicant;

receiving information input by the applicant to the merchant account activation application including type of business information, business contact information, business premises information, business sales data, business owner information, and information relating to finding for the charges associated with administering the merchant account;

displaying a menu of point of sale terminal options, displaying a view control item in associated with each option, receiving a user command input by the applicant selecting a particular view control item, and displaying an image depicting the point of sale terminal associated with the selected view control item;

receiving information input by the applicant selecting a point of sale terminal for use in connection with the merchant account;

determining a credit risk score based on information input by the applicant;

based on the credit risk score, determining terms and conditions applicable to the applicant if accepted including a fee schedule for the merchant account;

displaying the determined terms and conditions to the applicant relating to the administration of the merchant account;

receiving an indication of acceptance of the terms and conditions input by the applicant to the merchant account activation application;

generating identification information associated with the merchant account and the point of sale terminal;

storing information generated and received during the online session, including the identification information, in a master account file for administration of the merchant account; and electronically issuing a visitation order requesting a physical visit to the premises of the applicant to verify that the applicant is conducting the type of business input by the applicant in the application.

23. A computer-readable storage medium containing a set of instructions executable by a computer for causing the computer to perform a method for configuring a point-ofsale terminal for use in connection with a merchant account, during an on line session with an applicant for a merchant account, the method comprising the steps of:

generating a network accessible merchant account activation application for online access by an applicant for a merchant account during an online session with the applicant;

receiving a business type designation input by the applicant via the merchant account activation application;

determining a business risk category associated with the business type designation input by the applicant;

based on the business risk category associated with the business type designation, determining risk adjustment measures comprising a reserve requirement and a risk adjusted fee schedule for services related to administration of the merchant account;

displaying terms and conditions relating to the risk adjustment measures;

receiving an indication of acceptance of the terms and conditions input by the applicant to the merchant account activation application;

generating identification information associated with the merchant account and the point of sale terminal, the identification information comprising a merchant ID (MID) and a terminal ID (TID) associated with a selected point-of-sale terminal;

storing information generated and received during the online session, including the identification information and the risk adjustment measures, in a master account file for administration of the merchant account; and configuring the selected point-of-sale terminal by loading the identification information from the master account file into the selected point-of-sale terminal.

* * * * *